United States Patent
Terashima et al.

(10) Patent No.: US 12,473,050 B2
(45) Date of Patent: Nov. 18, 2025

(54) HUMAN-POWERED VEHICLE CONTROL DEVICE

(71) Applicant: Shimano Inc., Osaka (JP)

(72) Inventors: Keiji Terashima, Osaka (JP); Shinichiro Noda, Osaka (JP); Taihei Nishihara, Osaka (JP); Yoshinori Iino, Osaka (JP)

(73) Assignee: Shimano Inc., Osaka (JP)

( * ) Notice: Subject to any disclaimer, the term of this patent is extended or adjusted under 35 U.S.C. 154(b) by 459 days.

(21) Appl. No.: 17/519,111

(22) Filed: Nov. 4, 2021

(65) Prior Publication Data

US 2022/0153384 A1    May 19, 2022

(30) Foreign Application Priority Data

Nov. 19, 2020    (JP) ................................ 2020-192737

(51) Int. Cl.
*B62M 6/45*        (2010.01)
*B62M 6/55*        (2010.01)

(52) U.S. Cl.
CPC .............. *B62M 6/45* (2013.01); *B62M 6/55* (2013.01)

(58) Field of Classification Search
CPC .................... B62M 6/45; B62M 6/55
See application file for complete search history.

(56) References Cited

U.S. PATENT DOCUMENTS

| | | | |
|---|---|---|---|
| 2016/0297499 A1 | 10/2016 | Ohashi et al. | |
| 2018/0037294 A1* | 2/2018 | Kurotobi | ............... B62K 25/04 |
| 2019/0118892 A1* | 4/2019 | Nishino | .................. B62J 43/30 |
| 2019/0152560 A1 | 5/2019 | Iino et al. | |
| 2019/0241234 A1* | 8/2019 | Hattori | ..................... B62J 50/22 |

FOREIGN PATENT DOCUMENTS

| | | |
|---|---|---|
| CN | 105270556 A | 1/2016 |
| CN | 110316308 A | 10/2019 |
| JP | 2016-22798 A | 2/2016 |
| JP | 2016-199084 A | 12/2016 |
| JP | 2019-89518 A | 6/2019 |
| JP | 2019-116250 A | 7/2019 |

* cited by examiner

*Primary Examiner* — Kito R Robinson
*Assistant Examiner* — Roy Rhee
(74) *Attorney, Agent, or Firm* — Global IP Counselors LLP; David Tarnoff

(57) ABSTRACT

A human-powered vehicle control device includes an electronic controller that changes a control state of an assist motor in accordance with an operation of an operating device. The control state includes a first control state, a second control state where the motor is driven in correspondence with a human driving force input, and a third control state where the motor is driven in correspondence with the human driving force input. In a case where the operating device is operated in accordance with a first operation procedure in the first control state, the electronic controller changes from the first control state to the second control state. In a case where the operating device is operated in accordance with a second operation procedure in the first control state, the electronic controller changes from the first control state to the third control state.

25 Claims, 12 Drawing Sheets

HUMAN-POWERED VEHICLE CONTROL DEVICE

CROSS-REFERENCE TO RELATED APPLICATIONS

This application claims priority to Japanese Patent Application No. 2020-192737, filed on Nov. 19, 2020. The entire disclosure of Japanese Patent Application No. 2020-192737 is hereby incorporated herein by reference.

BACKGROUND

Technical Field

The present disclosure generally relates to a human-powered vehicle control device for controlling a motor of a human-powered vehicle.

Background Information

Japanese Laid-Open Patent Publication No. 2016-022798 (Patent Document 1) discloses an example of a control device for a human-powered vehicle configured to change a control state of a motor in accordance with an operation performed on an input portion.

SUMMARY

One objective of the present disclosure is to provide a human-powered vehicle control device for a human-powered vehicle configured to change a control state of a motor in a preferred manner.

A human-powered vehicle control device in accordance with a first aspect of the present disclosure is for a human-powered vehicle. The human-powered vehicle control device comprises an electronic controller configured to control a motor that applies a propulsion force to the human-powered vehicle. The electronic controller is configured to change a control state of the motor in accordance with an operation performed on a first operating portion of an operating device. The control state includes a first control state, a second control state in which the motor is driven in correspondence with a human driving force input to the human-powered vehicle, the second control state differing from the first control state, and a third control state in which the motor is driven in correspondence with the human driving force input to the human-powered vehicle, the third control state differing from the first control state and the second control state. The electronic controller is further configured to change the control state from the first control state to the second control state in a case where the first operating portion is operated in accordance with a first operation procedure in the first control state. The electronic controller is further configured to change the control state from the first control state to the third control state in a case where the first operating portion is operated in accordance with a second operation procedure that differs from the first operation procedure in the first control state. The human-powered vehicle control device according to the first aspect changes the control state of the motor from the first control state to the second control state or from the first control state to the third control state in accordance with the operation procedure of the first operating portion. Thus, the control state of the motor is changed in accordance with the intention of the user.

In accordance with a second aspect of the present disclosure, the human-powered vehicle control device according to the first aspect is configured so that the electronic controller changes at least one of an assist level of the motor, a maximum value of an assist force of the motor, and a reducing level of an output variation of the motor in accordance with the control state. The electronic controller is configured to control the motor so that the assist level in the third control state is greater than the assist level in the second control state in a case where the electronic controller changes the assist level in accordance with the control state. The electronic is configured to control controls the motor so that the maximum value of the assist force in the third control state is greater than the maximum value of the assist force in the second control state in a case where the electronic controller changes the maximum value of the assist force in accordance with the control state. The electronic controller is configured to control the motor so that the reducing level of the output variation of the motor in the third control state is greater than the reducing level of the output variation of the motor in the second control state in a case where the electronic controller changes the reducing level of the output variation of the motor in accordance with the control state. With the human-powered vehicle control device according to the second aspect, in accordance with operation of the user, the control state is readily changed from the first control state to one of the second control state and the third control state, which differ from each other in at least one of the assist level, the maximum value of the assist force, and the reducing level of the output variation of the motor and in which at least one of the assist level, the maximum value of the assist force, and the reducing level of the output variation of the motor are increased.

In accordance with a third aspect of the present disclosure, the human-powered vehicle control device according to the second aspect is configured so that the third control state includes control states that differ from each other in at least one of the assist level, the maximum value of the assist force, and the reducing level of the output variation of the motor. The electronic controller is configured to change the control state from the first control state to one of the control states included in the third control state in a case where the first operating portion is operated in accordance with the second operation procedure in the first control state. With the human-powered vehicle control device according to the third aspect, the control state is readily changed from the first control state to one of the control states included in the third control state in accordance with operation of the user.

In accordance with a fourth aspect of the present disclosure, the human-powered vehicle control device according to the third aspect is configured so that the one of the control states included in the third control state is selected in advance from the control states included in the third control state. The human-powered vehicle control device according to the fourth aspect eliminates the need for changing the control states included in the third control state one state at a time in a case where the control state is changed from the first control state to the one of the control states included in the third control state and selected in advance in accordance with operation of the user.

In accordance with a fifth aspect of the present disclosure, the human-powered vehicle control device according to the third aspect is configured so that the one of the control states included in the third control state is the one of the control states included in the third control state in which the at least one of the assist level, the maximum value of the assist force, and the reducing level of the output variation of the motor is the largest. The human-powered vehicle control device according to the fifth aspect eliminates the need for changing the control states included in the third control state one state at a time in a case where the control state is changed from the first control state to the one of the control states included in the third control state in which at least one of the assist level, the maximum value of the assist force, and the reducing level of the output variation of the motor is the largest in accordance with operation of the user.

In accordance with a sixth aspect of the present disclosure, the human-powered vehicle control device according to the first aspect is configured so that the electronic controller is configured to change at least one of an assist level of the motor, a maximum value of an assist force of the motor, and a reducing level of an output variation of the motor in accordance with the control state. The electronic controller is configured to control the motor so that the assist level in the third control state is less than the assist level in the second control state in a case where the electronic controller changes the assist level in accordance with the control state. The electronic controller is configured to control the motor so that the maximum value of the assist force in the third control state is less than the maximum value of the assist force in the second control state in a case where the electronic controller changes the maximum value of the assist force in accordance with the control state. The electronic controller is configured to control the motor so that the reducing level of the output variation of the motor in the third control state is less than the reducing level of the output variation of the motor in the second control state in a case where the electronic controller changes the reducing level of the output variation of the motor in accordance with the control state. With the human-powered vehicle control device according to the sixth aspect, the control state is readily changed from the first control state to one of the second control state and the third control state, which differ from each other in at least one of the assist level, the maximum value of the assist force, and the reducing level of the output variation of the motor and in which at least one of the assist level, the maximum value of the assist force, and the reducing level of the output variation of the motor is increased, in accordance with operation of the user.

In accordance with a seventh aspect of the present disclosure, the human-powered vehicle control device according to the sixth aspect is configured so that the third control state includes control states that differ from each other in the at least one of the assist level, the maximum value of the assist force, and the reducing level of the output variation of the motor. The electronic controller is configured to change the control state from the first control state to one of the control states included in the third control state in a case where the first operating portion is operated in accordance with the second operation procedure in the first control state. The human-powered vehicle control device according to the seventh aspect eliminates the need for changing the control states included in the third control state one state at a time in a case where the control state is changed from the first control state to one of the control states included in the third control state in accordance with operation of the user.

In accordance with an eighth aspect of the present disclosure, the human-powered vehicle control device according to the seventh aspect is configured so that the one of the control states included in the third control state is selected in advance from the control states included in the third control state. The human-powered vehicle control device according to the eighth aspect eliminates the need for changing the control states included in the third control state one state at a time in a case where the control state is changed from the first control state to the one of the control states included in the third control state and selected in advance in accordance with operation of the user.

In accordance with a ninth aspect of the present disclosure, the human-powered vehicle control device according to the seventh aspect is configured so that the one of the control states included in the third control state is the one of the control states included in the third control state in which the at least one of the assist level, the maximum value of the assist force, and the reducing level of the output variation of the motor is the smallest. The human-powered vehicle control device according to the ninth aspect eliminates the need for changing the control states included in the third control state one state at a time in a case where the control state is changed from the first control state to the one of the control states included in the third control state in which at least one of the assist level, the maximum value of the assist force, and the reducing level of the output variation of the motor is the smallest in accordance with operation of the user.

In accordance with a tenth aspect of the present disclosure, the human-powered vehicle control device according to any one of the first to ninth aspects is configured so that the first operation procedure includes operating the first operating portion once for an operating time that is within a predetermined first time. The second operation procedure includes at least one of operating the first operating portion once for an operating time that exceeds the predetermined first time, operating the first operating portion for a number of times within a predetermined second time, and within a predetermined third time, operating the first operating portion once for an operating time that is within the predetermined first time and operating the first operating portion once for an operating time that exceeds the predetermined first time. With the human-powered vehicle control device according to the tenth aspect, the user can readily distinguish between the first operation procedure and the second operation procedure.

In accordance with an eleventh aspect of the present disclosure, the human-powered vehicle control device according to any one of the third to fifth aspects is configured so that the first operation procedure includes operating the first operating portion once for an operating time that is within a predetermined first time. The second operation procedure includes at least one of operating the first operating portion once for an operating time that exceeds the predetermined first time, operating the first operating portion for a number of times within a predetermined second time, and within a predetermined third time, operating the first operating portion once for an operating time that is within the predetermined first time and operating the first operating portion once for an operating time that exceeds the predetermined first time. With the human-powered vehicle control device according to the eleventh aspect, the user can readily distinguish between the first operation procedure and the second operation procedure.

In accordance with a twelfth aspect of the present disclosure, the human-powered vehicle control device according to the eleventh aspect is configured so that the electronic controller is configured to change the control state from the first control state to one of the control states included in the third control state in accordance with one of the operations included in the second operation procedure. The electronic controller changes the control state from the first control state to another one of the control states included in the third control state in accordance with another one of the operations included in the second operation procedure. With the human-powered vehicle control device according to the twelfth aspect, the control state is readily changed from the first control state to each of the two control states included in the third control state in accordance with operation of the user.

In accordance with a thirteenth aspect of the present disclosure, the human-powered vehicle control device according to the eleventh or twelfth aspect is configured so that in a case where the first operating portion is operated once for an operating time that exceeds the predetermined first time in the first control state, the electronic controller is configured to change the control state from the first control state to the one of the control states in the third control state in which the at least one of the assist level, the maximum value of the assist force, and the reducing level of the output variation of the motor is the smallest. In a case where the first operating portion is continuously operated after changing the control state from the first control state to the one of the control states in the third control state in which the at least one of the assist level, the maximum value of the assist force, and the reducing level of the output variation of the motor is the smallest, the electronic controller is configured to change the control state from the one of the control states to another one of the control states to increase the at least one of the assist level, the maximum value of the assist force, and the reducing level of the output variation of the motor in a stepped manner whenever a predetermined fourth time elapses. The human-powered vehicle control device according to the thirteenth aspect changes the control state to increase at least one of the assist level, the maximum value of the assist force, and the reducing level of the output variation of the motor in a stepped manner in accordance with a continuous operation of the user performed on the first operating portion. Thus, the control state is readily changed in accordance with the intention of the user.

In accordance with a fourteenth aspect of the present disclosure, the human-powered vehicle control device according to any one of the seventh to ninth aspects is configured so that the first operation procedure includes operating the first operating portion once for an operating time that is within a predetermined first time. The second operation procedure includes at least one of operating the first operating portion once for an operating time that exceeds the predetermined first time, operating the first operating portion for a number of times within a predetermined second time, and within a predetermined third time, operating the first operating portion once for an operating time that is within the predetermined first time and operating the first operating portion once for an operating time that exceeds the predetermined first time. With the human-powered vehicle control device according to the fourteenth aspect, the user can readily distinguish between the first operation procedure and the second operation procedure.

In accordance with a fifteenth aspect of the present disclosure, the human-powered vehicle control device according to the fourteenth aspect is configured so that the electronic controller is configured to change the control state from the first control state to one of the control states included in the third control state in accordance with one of the operations included in the second operation procedure. The electronic controller is configured to change the control state from the first control state to another one of the control states included in the third control state in accordance with another one of the operations included in the second operation procedure. With the human-powered vehicle control device according to the fifteenth aspect, the control state is readily changed from the first control state to each of the two control states included in the third control state in accordance with operation of the user.

In accordance with a sixteenth aspect of the present disclosure, the human-powered vehicle control device according to the fourteenth or fifteenth aspect is configured so that the control states included in the third control state differ from each other in at least one of the assist level, the maximum value of the assist force, and the reducing level of the output variation of the motor. In a case where the first operating portion is operated once for an operating time that exceeds the predetermined first time in the first control state, the electronic controller is configured to change the control state from the first control state to the one of the control states in the third control state in which the at least one of the assist level, the maximum value of the assist force, and the reducing level of the output variation of the motor is the largest. In a case where the first operating portion is continuously operated after changing the control state to the one of the control states in the third control state in which the at least one of the assist level, the maximum value of the assist force, and the reducing level of the output variation of the motor is the largest, the electronic controller is configured to change the one of the control states to another one of the control states to decrease the at least one of the assist level, the maximum value of the assist force, and the reducing level of the output variation of the motor in a stepped manner whenever a predetermined fourth time elapses. The human-powered vehicle control device according to the sixteenth aspect changes the control state to decrease at least one of the assist level, the maximum value of the assist force, and the reducing level of the output variation of the motor in a stepped manner in accordance with a continuous operation of the user performed on the first operating portion. Thus, the control state is readily changed in accordance with the intention of the user.

In accordance with a seventeenth aspect of the present disclosure, the human-powered vehicle control device according to any one of the first to fifth and eleventh to thirteenth aspects is configured so that the operating device includes a second operating portion that differs from the first operating portion. The electronic controller is configured to change the control state of the motor in accordance with an operation performed on the second operating portion. The control state includes at least a fourth control state in which the motor is driven in correspondence with the human driving force, a fifth control state in which the motor is driven in correspondence with the human driving force, the fourth control state differing from the fifth control state, and a sixth control state that differs from the fourth control state and the fifth control state. The electronic controller is configured to change the control state from the fourth control state to the fifth control state in a case where the second operating portion is operated in accordance with a third operation procedure in the fourth control state. The electronic controller is configured to change the control state from the fourth control state to the sixth control state in a case where the second operating portion is operated in accordance with a fourth operation procedure that differs from the third operation procedure in the fourth control state. The human-powered vehicle control device according to the seventeenth aspect changes the control state of the motor from the fourth control state to the fifth control state or from the fourth control state to the fifth control state in accordance with the operation procedure of the second operating portion. Thus, the control state of the motor is changed in accordance with the intention of the user.

In accordance with an eighteenth aspect of the present disclosure, the human-powered vehicle control device according to the seventeenth aspect is configured so that the electronic controller changes at least one of an assist level of the motor, a maximum value of an assist force of the motor, and a reducing level of an output variation of the motor in accordance with the control state. The electronic controller is configured to control the motor so that the assist level in the sixth control state is less than the assist level in the fifth control state in a case where the electronic controller changes the assist level in accordance with the control state. The electronic controller is configured to control the motor so that the maximum value of the assist force in the sixth control state is less than the maximum value of the assist force in the fifth control state in a case where the electronic controller changes the maximum value of the assist force in accordance with the control state. The electronic controller is configured to control the motor so that the reducing level of the output variation of the motor in the sixth control state is less than the reducing level of the output variation of the motor in the fifth control state in a case where the electronic controller changes the reducing level of the output variation of the motor in accordance with the control state. With the human-powered vehicle control device according to the eighteenth aspect, the control state is readily changed from the fourth control state to one of the fifth control state and the sixth control state, which differ from each other in at least one of the assist level, the maximum value of the assist force, and the reducing level of the output variation of the motor and in which at least one of the assist level, the maximum value of the assist force, and the reducing level of the output variation of the motor is decreased, in accordance with operation of the user.

In accordance with a nineteenth aspect of the present disclosure, the human-powered vehicle control device according to the eighteenth aspect is configured so that the sixth control state includes control states that differ from each other in at least one of the assist level, the maximum value of the assist force, and the reducing level of the output variation of the motor. The electronic controller is configured to change the control state from the fourth control state to one of the control states included in the sixth control state in a case where the second operating portion is operated in accordance with the third operation procedure in the fourth control state. With the human-powered vehicle control device according to the nineteenth aspect, the control state is readily changed from the fourth control state to one of the control states included in the sixth control state in accordance with operation of the user.

In accordance with a twentieth aspect of the present disclosure, the human-powered vehicle control device according to the nineteenth aspect is configured so that the one of the control states included in the sixth control state is selected in advance from the control states included in the sixth control state. The human-powered vehicle control device according to the twentieth aspect eliminates the need for changing the control states included in the third control state one state at a time in a case where the control state is changed from the fourth control state to the one of control states included in the sixth control state and selected in advance in accordance with operation of the user.

In accordance with a twenty-first aspect of the present disclosure, the human-powered vehicle control device according to the nineteenth or twentieth aspect is configured so that the one of the control states included in the sixth control state is the one of the control states included in the sixth control state in which the at least one of the assist level, the maximum value of the assist force, and the reducing level of the output variation of the motor is the smallest. The human-powered vehicle control device according to the twenty-first aspect eliminates the need for changing the control states included in the sixth control state one state at a time in a case where the control state is changed from the fourth control state to the one of the control states included in the sixth control state in which at least one of the assist level, the maximum value of the assist force, and the reducing level of the output variation of the motor is the smallest in accordance with operation of the user.

In accordance with a twenty-second aspect of the present disclosure, the human-powered vehicle control device according to any one of the seventeenth to twenty-first aspects is configured so that the third operation procedure includes operating the second operating portion once for an operating time that is within a predetermined fifth time. The fourth operation procedure includes at least one of operating the second operating portion once for an operating time that exceeds the predetermined fifth time, operating the second operating portion for a number of times within a predetermined sixth time, and within a predetermined seventh time, operating the second operating portion once for an operating time that is within the predetermined fifth time and operating the second operating portion once for an operating time that exceeds the predetermined fifth time. With the human-powered vehicle control device according to the twenty-second aspect, the user can readily distinguish between the third operation procedure and the fourth operation procedure.

In accordance with a twenty-third aspect of the present disclosure, the human-powered vehicle control device according to any one of the nineteenth to twenty-first aspects is configured so that the third operation procedure includes operating the second operating portion once for an operating time that is within a predetermined fifth time. The fourth operation procedure includes at least one of operating the second operating portion once for an operating time that exceeds the predetermined fifth time, operating the second operating portion for a number of times within a predetermined sixth time, and within a predetermined seventh time, operating the second operating portion once for an operating time that is within the predetermined fifth time and operating the second operating portion once for an operating time that exceeds the predetermined fifth time. With the human-powered vehicle control device according to the twenty-third aspect, the user can readily distinguish between the third operation procedure and the fourth operation procedure.

In accordance with a twenty-fourth aspect of the present disclosure, the human-powered vehicle control device according to the twenty-third aspect is configured so that the electronic controller is configured to change the control state from the fourth control state to one of the control states included in the sixth control state in accordance with one of the operations included in the fourth operation procedure. The electronic controller changes the control state from the fourth control state to another one of the control states included in the sixth control state in accordance with another one of the operations included in the fourth operation procedure. With the human-powered vehicle control device according to the twenty-fourth aspect, the control state is readily changed from the fourth control state to each of the two control states included in the sixth control state in accordance with operation of the user.

In accordance with a twenty-fifth aspect of the present disclosure, the human-powered vehicle control device according to the twenty-third or twenty-fourth aspect is configured so that the control states included in the sixth control state differ from each other in at least one of the assist level, the maximum value of the assist force, and the reducing level of the output variation of the motor. In a case where the second operating portion is operated once for an operating time that exceeds the predetermined fifth time in the fourth control state, the electronic controller is configured to change the control state from the fourth control state to the one of the control states in the sixth control state in which the at least one of the assist level, the maximum value of the assist force, and the reducing level of the output variation of the motor is the largest. In a case where the second operating portion is continuously operated after changing the control state to the one of the control states in the sixth control state in which the at least one of the assist level, the maximum value of the assist force, and the reducing level of the output variation of the motor is the largest, the electronic controller is configured to change the control state from the one of the control states to another one of the control states to decrease the at least one of the assist level, the maximum value of the assist force, and the reducing level of the output variation of the motor in a stepped manner whenever a predetermined eighth time elapses. The human-powered vehicle control device according to the twenty-fifth aspect changes the control state to decrease at least one of the assist level, the maximum value of the assist force, and the reducing level of the output variation of the motor in a stepped manner in accordance with a continuous operation of the user performed on the second operating portion. Thus, the control state is readily changed in accordance with the intention of the user.

A human-powered vehicle control device in accordance with a twenty-sixth aspect of the present disclosure is for a human-powered vehicle. The human-powered vehicle control device comprises an electronic controller configured to control a motor, which applies a propulsion force to a human-powered vehicle, in correspondence with a control parameter related to the motor and a human driving force input to the human-powered vehicle. The electronic controller is configured to increase a changing amount of the control parameter as a time for operating an operating device once becomes longer. The human-powered vehicle control device according to the twenty-sixth aspect increases the changing amount of the control parameter in accordance with the time for operating the operating device once by the user. Thus, the control state is readily changed in accordance with the intention of the user, and the control state of the motor is changed in a preferred manner.

In accordance with a twenty-seventh aspect of the present disclosure, the human-powered vehicle control device according to the twenty-sixth aspect is configured so that the operating device includes a first operating portion and a second operating portion. The electronic controller is configured to increase the control parameter as a time for operating the first operating portion of the operating device once becomes longer. The electronic controller is configured to decrease the control parameter as a time for operating the second operating portion of the operating device once becomes longer. With the human-powered vehicle control device according to the twenty-seventh aspect, the control state is readily changed in accordance with the intention of the user in each of a case where the control parameter is increased and a case where the control parameter is decreased.

In accordance with a twenty-eighth aspect of the present disclosure, the human-powered vehicle control device according to the twenty-sixth or twenty-seventh aspect is configured so that the control parameter includes at least one of an assist level of the motor, a maximum value of an assist force of the motor, and a reducing level of an output variation of the motor with respect to a change in the human driving force. With the human-powered vehicle control device according to the twenty-eighth aspect, at least one of the assist level, the maximum value of the assist force, and the reducing level of the output variation of the motor is readily changed to the control state in accordance with the intention of the user.

The human-powered vehicle control device for a human-powered vehicle according to the present disclosure controls the control state of the motor in a preferred manner.

BRIEF DESCRIPTION OF THE DRAWINGS

Referring now to the attached drawings which form a part of this original disclosure.

DETAILED DESCRIPTION OF EMBODIMENTS

Figure 1:
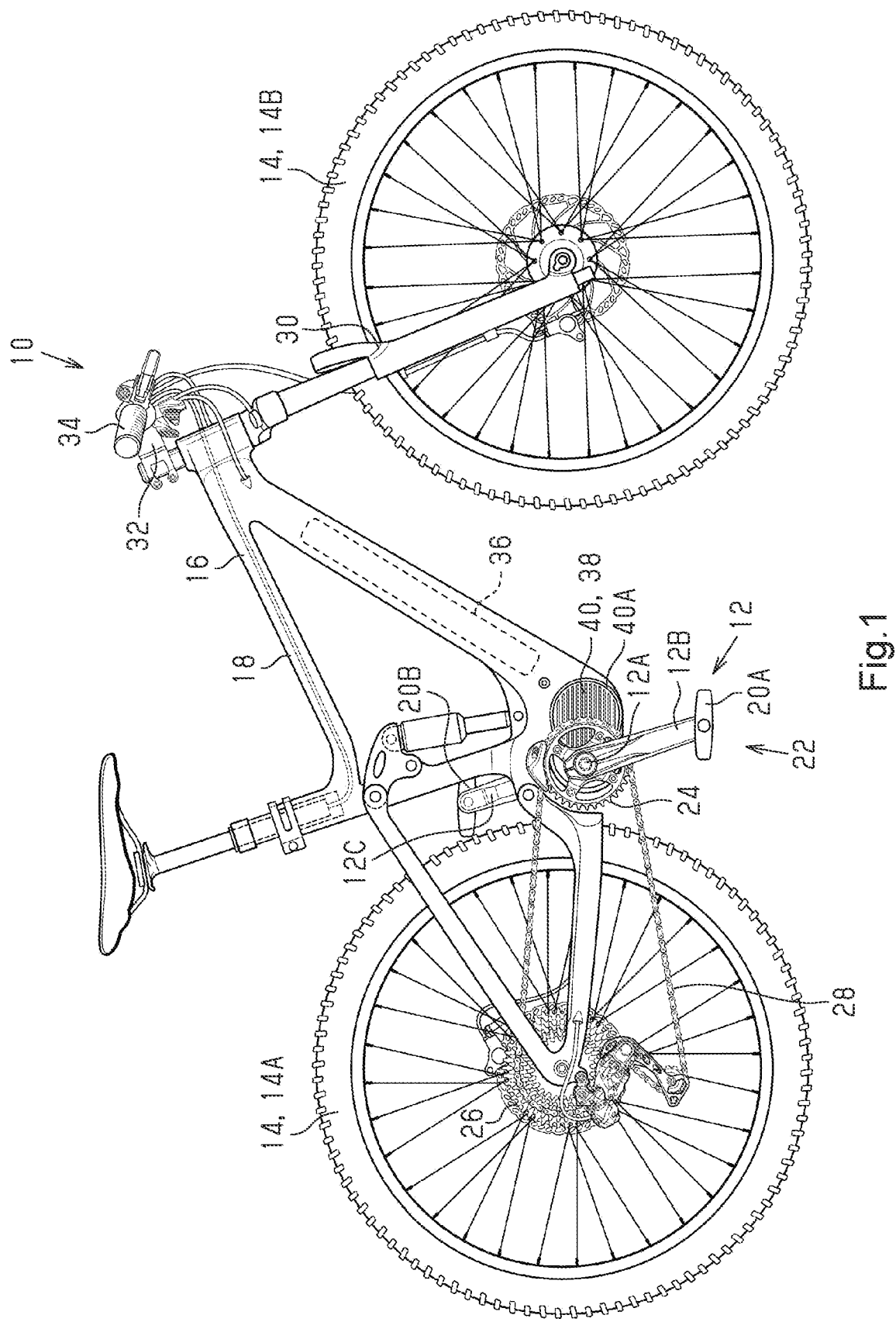
FIG. 1 is a side elevational view of a human-powered vehicle (e.g., a bicycle) including a first embodiment of a human-powered vehicle control device.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a human-powered vehicle control device 60 for a human-powered vehicle will now be described with reference to FIGS. 1 to 11. A human-powered vehicle 10 is a vehicle including at least one wheel and driven by at least a human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 is not limited to a vehicle configured to be driven only by the human driving force H. The human-powered vehicle 10 includes an E-bike that uses a driving force of an electric motor in addition to the human driving force H for propulsion. The E-bike includes an electric assist bicycle that assists in propulsion with an electric motor. In the embodiments described below, the human-powered vehicle 10 refers to an electric assist mountain bike.

The human-powered vehicle 10 includes a crank 12 into which the human driving force H is input. The human-powered vehicle 10 further includes at least one wheel 14 and a vehicle body 16. The at least one wheel 14 includes a rear wheel 14A and a front wheel 14B. The vehicle body 16 includes a frame 18. The crank 12 includes an input rotational shaft 12A rotatable relative to the frame 18, a first crank arm 12B provided on a first axial end of the input rotational shaft 12A, and a second crank arm 12C provided on a second axial end of the input rotational shaft 12A. In the present embodiment, the input rotational shaft 12A is a crank axle. A first pedal 20A is coupled to the first crank arm 12B. A second pedal 20B is coupled to the second crank arm 12C.

A drive mechanism 22 includes a first rotary body 24 coupled to the input rotational shaft 12A. The input rotational shaft 12A and the first rotary body 24 can be coupled so as to rotate integrally with each other or can be coupled by a first one-way clutch. The first one-way clutch is configured to rotate the first rotary body 24 forward in a case where the crank 12 rotates forward and allow the first rotary body 24 to rotate relative to the crank 12 in a case where the crank 12 rotates rearward. The first rotary body 24 includes a sprocket, a pulley, or a bevel gear. The drive mechanism 22 further includes a second rotary body 26 and a linking member 28. The linking member 28 transmits rotational force of the first rotary body 24 to the second rotary body 26. The linking member 28 includes, for example, a chain, a belt, or a shaft.

The second rotary body 26 is coupled to the rear wheel 14A. The second rotary body 26 includes a sprocket, a pulley, or a bevel gear. Preferably, a second one-way clutch is provided between the second rotary body 26 and the rear wheel 14A. The second one-way clutch is configured to rotate the rear wheel 14A forward in a case where the second rotary body 26 rotates forward and allow the rear wheel 14A to rotate relative to the second rotary body 26 in a case where the second rotary body 26 rotates rearward. The human-powered vehicle 10 can include a shifting device. The shifting device includes at least one of an external shifting device and an internal shifting device. The external shifting device includes, for example, a derailleur, the first rotary body 24, and the second rotary body 26. The derailleur includes at least one of a front derailleur and a rear derailleur. The first rotary body 24 can include multiple sprockets. The second rotary body 26 can include multiple sprockets. The internal shifting device can be provided, for example, on a hub of the rear wheel 14A or in a power transmission path between the input rotational shaft 12A and the first rotary body 24.

The front wheel 14B is attached to the frame 18 by a front fork 30. A handlebar 34 is coupled to the front fork 30 by a stem 32. In the present embodiment, the rear wheel 14A is coupled to the crank 12 by the drive mechanism 22. However, any one of the rear wheel 14A and the front wheel 14B can be coupled to the crank 12 by the drive mechanism 22.

The human-powered vehicle 10 further includes a battery 36. The battery 36 includes one or more battery elements. The battery elements include a rechargeable battery. The battery 36 is configured to supply electric power to the human-powered vehicle control device 60. Preferably, the battery 36 is connected to an electronic controller 62 of the human-powered vehicle control device 60 by an electric cable or a wireless communication device to communicate with the electronic controller 62. The battery 36 is configured to communicate with the electronic controller 62 through, for example, power line communication (PLC), controller area network (CAN), or universal asynchronous receiver/transmitter (UART).

The human-powered vehicle 10 includes a motor 38 configured to apply a propulsion force to the human-powered vehicle 10. The motor 38 includes one or more electric motors. The electric motor is, for example, a brushless motor. The motor 38 is configured to transmit a rotational force to at least one of the front wheel 14B and a power transmission path of the human driving force H extending from the pedals 20A and 20B to the rear wheel 14A. The power transmission path of the human driving force H extending from the pedals 20A and 20B to the rear wheel 14A includes the rear wheel 14A. In the present embodiment, the motor 38 is provided on the frame 18 of the human-powered vehicle 10 and is configured to transmit rotational force to the first rotary body 24. Thus, the motor 38 constitutes an assist motor.

The motor 38 is provided on a housing 40A. The housing 40A is provided on the frame 18. The housing 40A is, for example, detachably attached to the frame 18. The motor 38 and the housing 40A on which the motor 38 is provided are included in a drive unit 40. The drive unit 40 can include a speed reducer connected to an output shaft of the motor 38. In the present embodiment, the housing 40A rotatably supports the input rotational shaft 12A. In the present embodiment, preferably, a third one-way clutch is provided on the power transmission path between the motor 38 and the input rotational shaft 12A so that in a case where the input rotational shaft 12A is rotated in a direction in which the human-powered vehicle 10 travels forward, rotational force of the crank 12 will not be transmitted to the motor 38. In a case where the motor 38 is provided on at least one of the rear wheel 14A and the front wheel 14B, the motor 38 can be provided on a hub and form a hub motor together with the hub.

The human-powered vehicle control device 60 includes the electronic controller 62. The electronic controller 62 includes one or more processors 62A that executes a predetermined control program. The processor of the electronic controller 62 includes, for example, a central processing unit (CPU) or a micro processing unit (MPU). The electronic controller 62 can include processors provided at positions separate from each other. For example, some of the processors can be provided on the human-powered vehicle 10, and some of the processors can be provided on a server connected to the Internet. In a case where the processors are provided at positions separate from each other, the processors are connected so as to communicate with each other via a wireless communication device. The electronic controller 62 can include one or more microcomputers. Thus, the term "electronic controller" as used herein refers to hardware that executes a software program, and does not include a human.

Preferably, the human-powered vehicle control device 60 further includes storage 64. The storage 64 stores a control program and information used for a control process. The storage 64 includes any computer storage device or any non-transitory computer-readable medium with the sole exception of a transitory, propagating signal. For example, the storage 64 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Preferably, the human-powered vehicle control device 60 further includes a drive circuit 66 of the motor 38. Preferably, the drive circuit 66 and the electronic controller 62 are provided on the housing 40A of the drive unit 40. The drive circuit 66 and the electronic controller 62 can be provided, for example, on the same circuit substrate. The drive circuit 66 includes an inverter circuit. The drive circuit 66 controls electric power supplied from the battery 36 to the motor 38. The drive circuit 66 is connected to the electronic controller 62 by a conductive wire, an electric cable, or a wireless communication device. The drive circuit 66 drives the motor 38 in accordance with a control signal from the electronic controller 62.

Preferably, the human-powered vehicle 10 further includes a vehicle speed sensor 42. Preferably, the human-powered vehicle 10 further includes at least one of a crank rotation sensor 44 and a human driving force detector 46. The terms "sensor" and as "detector" used herein refers to a hardware device or instrument designed to detect the presence or absence of a particular event, object, substance, or a change in its environment, and to emit a signal in response. The terms "sensor" and as "detector" as used herein does not include a human.

The vehicle speed sensor 42 is configured to detect information related to a vehicle speed V of the human-powered vehicle 10. In the present embodiment, the vehicle speed sensor 42 is configured to detect information related to rotational speed W of at least one wheel 14 of the human-powered vehicle 10. The vehicle speed sensor 42 is configured to, for example, detect a magnet provided on at least one wheel 14 of the human-powered vehicle 10. The vehicle speed sensor 42 is configured to, for example, output a detection signal a predetermined number of times while one of the at least one wheel 14 performs one rotation. The predetermined number of times is, for example, one. The vehicle speed sensor 42 outputs a signal corresponding to the rotational speed W of the wheel 14. The electronic controller 62 calculates vehicle speed V of the human-powered vehicle 10 based on a signal corresponding to the rotational speed W of the wheel 14 and information related to the perimeter of the wheel 14. The information related to the perimeter of the wheel 14 is stored in the storage 64.

The vehicle speed sensor 42 includes, for example, a magnetic reed forming a reed switch or a magnetic sensor such as a Hall element. The vehicle speed sensor 42 can be attached to a chainstay of the frame 18 of the human-powered vehicle 10 and configured to detect a magnet attached to the rear wheel 14A or can be provided on the front fork 30 and configured to detect a magnet attached to the front wheel 14B. In the present embodiment, the vehicle speed sensor 42 is configured to detect the magnet once with the reed switch in one rotation of the wheel 14. The vehicle speed sensor 42 can have any configuration that obtains information related to the vehicle speed V of the human-powered vehicle 10. The vehicle speed sensor 42 is not limited to a configuration that detects a magnet provided on the wheel 14 and can, for example, be configured to detect a slit provided on a disc brake, include an optical sensor, or include a global positioning system (GPS) receiver. In a case where the vehicle speed sensor 42 includes a GPS receiver, the electronic controller 62 can calculate the vehicle speed V based on time and a travelled distance. The vehicle speed sensor 42 is connected to the electronic controller 62 by a wireless communication device or an electric cable.

The crank rotation sensor 44 is configured to detect information related to a rotational speed C of the input rotational shaft 12A. The crank rotation sensor 44 is provided, for example, on the frame 18 of the human-powered vehicle 10 or the drive unit 40. The crank rotation sensor 44 can be provided on the housing 40A of the drive unit 40. The crank rotation sensor 44 is configured to include a magnetic sensor that outputs a signal corresponding to the strength of the magnetic field. An annular magnet having a magnetic field, the strength of which changes in the circumferential direction, is provided on the input rotational shaft 12A, a member that rotates in cooperation with the input rotational shaft 12A, or a power transmission path extending between the input rotational shaft 12A and the first rotary body 24. The member that rotates in cooperation with the input rotational shaft 12A can include an output shaft of the motor 38.

The crank rotation sensor 44 outputs a signal corresponding to the rotational speed C of the input rotational shaft 12A. For example, in a case where the first one-way clutch is not provided between the input rotational shaft 12A and the first rotary body 24, the magnet can be provided on the first rotary body 24. The crank rotation sensor 44 can have any configuration that obtains information related to the rotational speed C of the input rotational shaft 12A and can include an optical sensor, an acceleration sensor, a gyro sensor, or a torque sensor instead of a magnetic sensor. The crank rotation sensor 44 is connected to the electronic controller 62 by a wireless communication device or an electric cable.

The human driving force detector 46 is configured to detect information related to the human driving force H. The human driving force detector 46 is provided, for example, on the frame 18 of the human-powered vehicle 10, the drive unit 40, the crank 12, or the pedals 20A and 20B. The human driving force detector 46 can be provided on the housing 40A of the drive unit 40. The human driving force detector 46 includes, for example, a torque sensor. The torque sensor is configured to output a signal corresponding to torque applied to the crank 12 by the human driving force H. For example, in a case where the first one-way clutch is provided on the power transmission path, it is preferred that the torque sensor is provided at the upstream side of the first one-way clutch in the power transmission path. The torque sensor includes, for example, a strain sensor, a magnetostrictive sensor, or a pressure sensor. The strain sensor includes a strain gauge.

The torque sensor is provided in the power transmission path or the vicinity of a member included in the power transmission path. The member included in the power transmission path includes, for example, the input rotational shaft 12A, a member that transmits the human driving force H between the input rotational shaft 12A and the first rotary body 24, the crank arms 12B and 12C, and the pedals 20A and 20B. The human driving force detector 46 is connected to the electronic controller 62 via a wireless communication device or an electric cable. The human driving force detector 46 can have any configuration that obtains information related to the human driving force H and can include, for example, a sensor that detects pressure applied to the pedals 20A and 20B or a sensor that detects tension of a chain.

The electronic controller 62 is configured to control the motor 38 that applies propulsion force to the human-powered vehicle 10. Preferably, the electronic controller 62 is configured to control the motor 38 in accordance with the human driving force H that is input to the human-powered vehicle 10. The human driving force H can be expressed as torque or power.

The electronic controller 62 is configured to control the motor 38, for example, so that the assist level of the motor 38 equals a predetermined assist level A. An assist level A includes a ratio of assist force generated by the motor 38 to the human driving force H and a ratio of assist force of the motor 38 to rotational speed of the crank 12. In this description, the ratio of the assist force produced by the motor 38 to the human driving force H is also referred to as the assist ratio. The electronic controller 62 is configured to control the motor 38, for example, so that the ratio of assist force produced by the motor 38 to the human driving force H equals a predetermined ratio. The human driving force H corresponds to propulsion force of the human-powered vehicle 10 that is generated by the user rotating the crank 12. The assist force corresponds to propulsion force of the human-powered vehicle 10 that is generated by rotation of the motor 38. The predetermined ratio is not fixed and can be changed, for example, in accordance with the human driving force H, the rotational speed C of the input rotational shaft 12A, or the vehicle speed V, or any two or all of the human driving force H, the rotational speed C of the input rotational shaft 12A, the vehicle speed V.

In a case where the human driving force H and the assist force are expressed as torque, the human driving force H is referred to as a human torque HT, and the assist force is referred to as an assist torque MT. In a case where the human driving force H and the assist force are expressed as power, the human driving force H is referred to as a human power HW, and the assist force is referred to as an assist power MW. The ratio can be a torque ratio of the assist torque MT to the human torque HT of the human-powered vehicle 10 or can be a ratio of the assist power MW of the motor 38 to the human power HW.

In the drive unit 40 of the present embodiment, the crank 12 is connected to the first rotary body 24 without using a shifting device, and an output of the motor 38 is input to the first rotary body 24. In a case where the crank 12 is connected to the first rotary body 24 without using the shifting device and the output of the motor 38 is input to the first rotary body 24, the human driving force H corresponds to driving force that is generated by the user rotating the crank 12 and is input to the first rotary body 24. In a case where the crank 12 is connected to the first rotary body 24 without using the shifting device and the output of the motor 38 is input to the first rotary body 24, the assist force corresponds to driving force that is generated by rotation of the motor 38 and is input to the first rotary body 24. In a case where the output of the motor 38 is input to the first rotary body 24 through a speed reducer, the assist force corresponds to an output of the speed reducer.

In a case where the motor 38 is provided on the rear wheel 14A, the human driving force H corresponds to an output of the rear wheel 14A driven by only the user. In a case where the motor 38 is provided on the rear wheel 14A, assist force corresponds to an output of the rear wheel 14A driven by only the motor 38. In a case where the motor 38 is provided on the front wheel 14B, the human driving force H corresponds to an output of the rear wheel 14A driven by only the user. In a case where the motor 38 is provided on the front wheel 14B, assist force corresponds to an output of the front wheel 14B driven by only the motor 38.

The electronic controller 62 is configured to control the motor 38 so that the assist force becomes less than or equal to an upper limit value MX. In a case where the output of the motor 38 is input to the first rotary body 24 and the assist force is expressed as torque, the electronic controller 62 is configured to control the motor 38 so that the assist torque MT becomes less than or equal to an upper limit value MTX. Preferably, the upper limit value MTX is in a range of 20 Nm or greater and 200 Nm or less. The upper limit value MTX is specified, for example, by an output characteristic of the motor 38. In a case where the output of the motor 38 is input to the first rotary body 24 and the assist force is expressed as power, the electronic controller 62 is configured to control the motor 38 so that the assist power MW becomes less than or equal to an upper limit value MWX.

Preferably, the electronic controller 62 is configured to change a reducing level R of an output variation of the motor 38. As the reducing level R of the output variation of the motor 38 increases, a changing amount of output of the motor 38 per unit time decreases relative to a changing amount of a control parameter of the motor 38 per unit time. As the reducing level R of the output variation of the motor 38 decreases, the changing amount of output of the motor 38 per unit time increases relative to the changing amount of the control parameter of the motor 38 per unit time. The control parameter of the motor 38 is the human driving force H or the rotational speed C of the input rotational shaft 12A. Preferably, the reducing level R of the output variation of the motor 38 includes at least one of a first reducing level R1 in a case where the human driving force H or the rotational speed C of the input rotational shaft 12A increases and a second reducing level R2 in a case where the human driving force H or the rotational speed C of the input rotational shaft 12A decreases. The reducing level R of the output variation of the motor 38 is inversely proportional to a response speed of the motor 38. The response speed of the motor 38 is expressed as the changing amount of output of the motor 38 per unit time relative to the changing amount of the control parameter of the motor 38 per unit time. Increases in the reducing level R of the output variation of the motor 38 decrease the response speed of the motor 38.

The electronic controller 62 changes the first reducing level R1 using, for example, a first filter. The first filter includes, for example, a low-pass filter having a first time constant. The electronic controller 62 changes the first reducing level R1 by changing the first time constant of the first filter. The electronic controller 62 can change the first reducing level R1 by changing a gain for calculating the output of the motor 38 from the human driving force H. The first filter is, for example, implemented by executing predetermined software with a processor.

The electronic controller 62 changes the second reducing level R2 using, for example, a second filter. The second filter includes, for example, a low-pass filter having a second time constant. The electronic controller 62 changes the second reducing level R2 by changing the second time constant of the second filter. The electronic controller 62 can change the second reducing level R2 by changing a gain for calculating the output of the motor 38 from the human driving force H. The second filter is, for example, implemented by executing predetermined software with a processor.

The human-powered vehicle 10 further includes an operating device 48. Preferably, the operating device 48 is provided on the handlebar 34. The operating device 48 includes a first operating portion 50. Preferably, the operating device 48 includes a second operating portion 52 that differs from the first operating portion 50. The operating device 48 can further include a third operation portion 53 that differs from the first operating portion 50 and the second operating portion 52. Preferably, the first operating portion 50 includes a pushbutton or a lever. Preferably, the second operating portion 52 includes a pushbutton or a lever. For example, the first operating portion 50 and the second operating portion 52 include an electrical switch. Preferably, the electrical switch included in the first operating portion 50 and the second operating portion 52 is of a normally open type. The first operating portion 50 and the second operating portion 52 can include a touchscreen.

The operating device 48 can be included, for example, in a cycle computer or a smartphone. Preferably, the third operation portion 53 includes a pushbutton. For example, the third operation portion 53 includes an electrical switch in the same manner as the first operating portion 50 and the second operating portion 52. The third operation portion 53 can be, for example, a power switch that switches on and off the human-powered vehicle control device 60, a presentation changing switch that changes the presentation of a display, or a lamp switch that switches on and off a front light.

The electronic controller 62 is configured to change a control state of the motor 38 in accordance with an operation performed on the first operating portion 50 of the operating device 48. The control state includes a first control state, a second control state, and a third control state. In the second control state, the motor 38 is driven in correspondence with the human driving force H input to the human-powered vehicle 10. The second control state differs from the first control state. In the third control state, the motor 38 is driven in correspondence with the human driving force H input to the human-powered vehicle 10. The third control state differs from the first control state and the second control state. Each control state corresponds to a control mode that can be selected by the user.

Preferably, the electronic controller 62 changes at least one of the assist level A of the motor 38, a maximum value MX of assist force of the maximum value MX of assist force of the motor 38, and the reducing level R of the output variation of the motor 38 in accordance with the control state. The control state can include an off mode in which the motor 38 is not driven.

Preferably, the third control state includes control states that differ from each other in at least one of the assist level A, the maximum value MX of assist force, and the reducing level R of the output variation of the motor 38.

In a case where the first operating portion 50 is operated in accordance with a first operation procedure in the first control state, the electronic controller 62 changes the control state from the first control state to the second control state. In a case where the first operating portion 50 is operated in accordance with a second operation procedure that differs from the first operation procedure in the first control state, the electronic controller 62 changes the control state from the first control state to the third control state.

The first operation procedure includes operating the first operating portion 50 once for an operating time T that is within a first predetermined time T1. The second operation procedure includes at least one of operating the first operating portion 50 once for an operating time T that exceeds the first predetermined time T1, operating the first operating portion 50 for a number of times within a predetermined second time T2, and within a predetermined third time T3, operating the first operating portion 50 once for the operating time T that is within the predetermined first time T1 and operating the first operating portion 50 once for the operating time T that exceeds the predetermined first time T1.

The first predetermined time T1 is, for example, included in a range from 0.2 seconds to 1 second. The predetermined second time T2 is, for example, included in a range from 0.2 seconds to 2 seconds. The predetermined third time T3 is, for example, included in a range from 0.2 seconds to 2 seconds.

For example, in a case where the first operating portion 50 is not operated by the user, a first signal is input to the electronic controller 62 from the first operating portion 50. While the first operating portion 50 is operated by the user, a second signal is input to the electronic controller 62 from the first operating portion 50. In a case where the first operating portion 50 includes a normally open switch, the first signal is a deactivation signal, and the second signal is an activation signal. For example, the first signal is expressed as a direct current voltage having a voltage value that is less than a predetermined voltage. For example, the second signal is expressed as a direct current voltage having a voltage value that is greater than the predetermined voltage.

Figure 4:
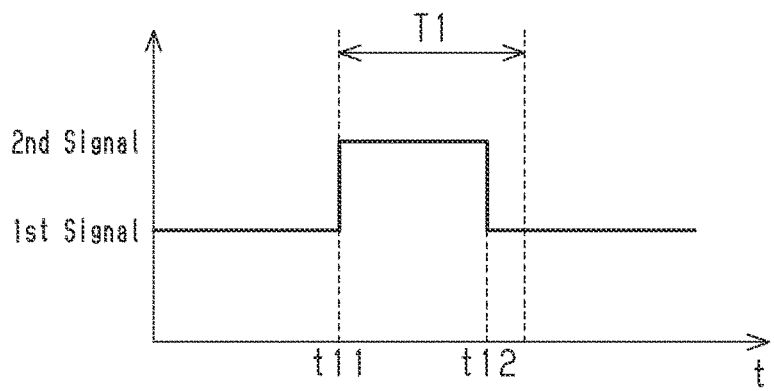
FIG. 4 is a timing chart showing an example of output signals in a case where the first operating portion shown in FIG. 2 is operated in accordance with a first operation procedure.

FIG. 4 shows an example of an output signal of the first operating portion 50 in a case where the first operating portion 50 is operated in accordance with the first operation procedure. In FIG. 4, t11 indicates the time at which the signal from the first operating portion 50 is changed from the first signal to the second signal. In FIG. 4, t12 indicates the time at which the signal from the first operating portion 50 is changed from the second signal to the first signal. In a case where the time from time t11 to time t12 is within the first predetermined time T1, the electronic controller 62 determines that the first operating portion 50 is operated in accordance with the first operation procedure.

Figure 5:
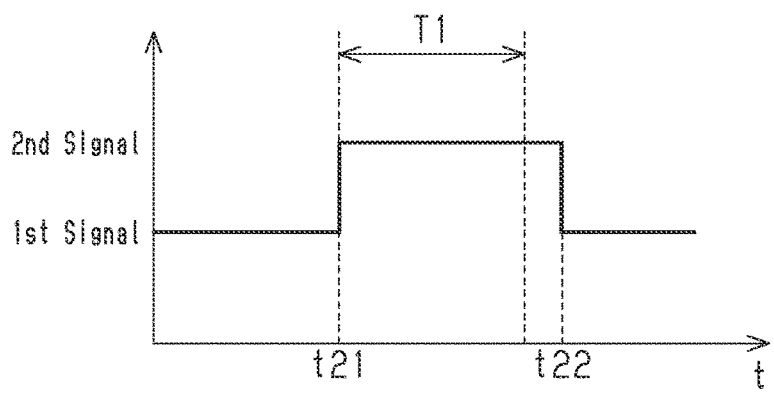
FIG. 5 is a timing chart showing a first example of output signals in a case where the first operating portion shown in FIG. 2 is operated in accordance with a second operation procedure.

FIG. 5 shows an example of an output signal of the first operating portion 50 in a case where the first operating portion 50 is operated in accordance with the second operation procedure. In FIG. 5, t21 indicates the time at which the signal from the first operating portion 50 is changed from the first signal to the second signal. In FIG. 5, t22 indicates the time at which the signal from the first operating portion 50 is changed from the second signal to the first signal. In a case where the time from time t21 to time t22 exceeds the first predetermined time T1, the electronic controller 62 determines that the first operating portion 50 is operated in accordance with the second operation procedure.

Figure 6:
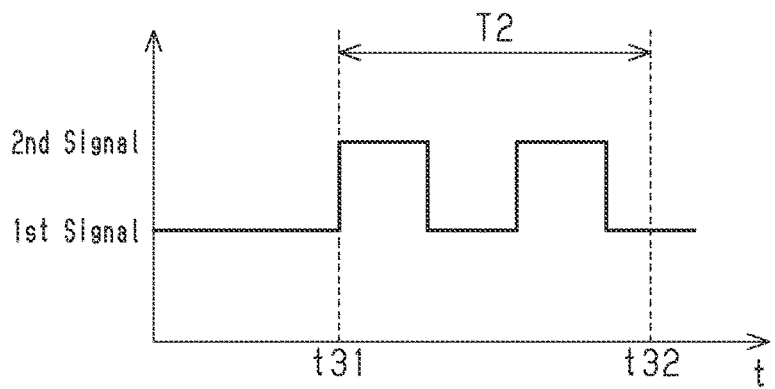
FIG. 6 is a timing chart showing a second example of output signals in a case where the first operating portion shown in FIG. 2 is operated in accordance with a second operation procedure.

FIG. 6 shows another example of the output signal of the first operating portion 50 in a case where the first operating portion 50 is operated in accordance with the second operation procedure. In FIG. 6, t31 indicates the time at which the signal from the first operating portion 50 is changed from the first signal to the second signal. In FIG. 6, t32 indicates the time at which the second time T2 has elapsed from t31. In a case where the signal from the first operating portion 50 is changed from the first signal to the second signal a number of times during a period from time t31 to time t32, the electronic controller 62 determines that the first operating portion 50 is operated in accordance with the second operation procedure. Alternatively, in a case where the signal from the first operating portion 50 is changed from the second signal to the first signal a number of times during the period from time t31 to time t32, the electronic controller 62 can determine that the first operating portion 50 is operated in accordance with the second operation procedure.

In a case where the third control state includes control states that differ from each other in at least one of the assist level A, the maximum value MX of assist force, and the reducing level R of the output variation of the motor 38, the electronic controller 62 changes the control state from the first control state to one of the control states included in the third control state in a case where the first operating portion 50 is operated in accordance with the second operation procedure in the first control state.

Preferably, the one of the control states included in the third control state is selected in advance from the control states included in the third control state. For example, information related to the control state that is selected in advance is stored in the storage 64. The information related to the control state that is selected in advance can be changed by the user with the operating device 48 or an external device that is connected to the human-powered vehicle control device 60 by a wireless communication device or an electric cable.

The electronic controller 62 controls the motor 38 so that the assist level A in the third control state is greater than the assist level A in the second control state in a case where the electronic controller 62 changes the assist level A in accordance with the control state. The electronic controller 62 controls the motor 38 so that the maximum value MX of assist force in the third control state is greater than the maximum value MX of assist force in the second control state in a case where the electronic controller 62 changes the maximum value MX of assist force in accordance with the control state. The electronic controller 62 controls the motor 38 so that the reducing level R of the output variation of the motor 38 in the third control state is greater than the reducing level R of the output variation of the motor 38 in the second control state in a case where the electronic controller 62 changes the reducing level R of the output variation of the motor 38 in accordance with the control state.

In a case where the electronic controller 62 changes the reducing level R of the output variation of the motor 38 in accordance with the control state, it is preferred that the electronic controller 62 does not change the first reducing level R1 and changes the second reducing level R2. For example, the electronic controller 62 controls the motor 38 so that the second reducing level R2 of the output variation of the motor 38 in the third control state is greater than the second reducing level R2 of the output variation of the motor 38 in the second control state in a case where the electronic controller 62 changes the reducing level R of the output variation of the motor 38 in accordance with the control state. For example, the electronic controller 62 controls the motor 38 so that the first reducing level R1 of the output variation of the motor 38 in the third control state is equal to the first reducing level R1 of the output variation of the motor 38 in the second control state in a case where the electronic controller 62 changes the reducing level R of the output variation of the motor 38 in accordance with the control state.

The electronic controller 62 can change only the first reducing level R1, that is, does not change the second reducing level R2, in a case where the electronic controller 62 changes the reducing level R of the motor 38 in accordance with the control state. The electronic controller 62 can change both the first reducing level R1 and the second reducing level R2 in a case where the electronic controller 62 changes the reducing level R of the output variation of the motor 38 in accordance with the control state. The electronic controller 62 can control the motor 38 so that the first reducing level R1 of the output variation of the motor 38 in the third control state is less than the first reducing level R1 of the output variation of the motor 38 in the second control state in a case where the electronic controller 62 changes the reducing level R of the output variation of the motor 38 in accordance with the control state.

In a case where the third control state includes multiple control states, for example, one of the control states included in the third control state is one of the control states included in the third control state in which at least one of the assist level A, the maximum value MX of assist force, and the reducing level R of the motor 38 is the largest.

Figure 7:
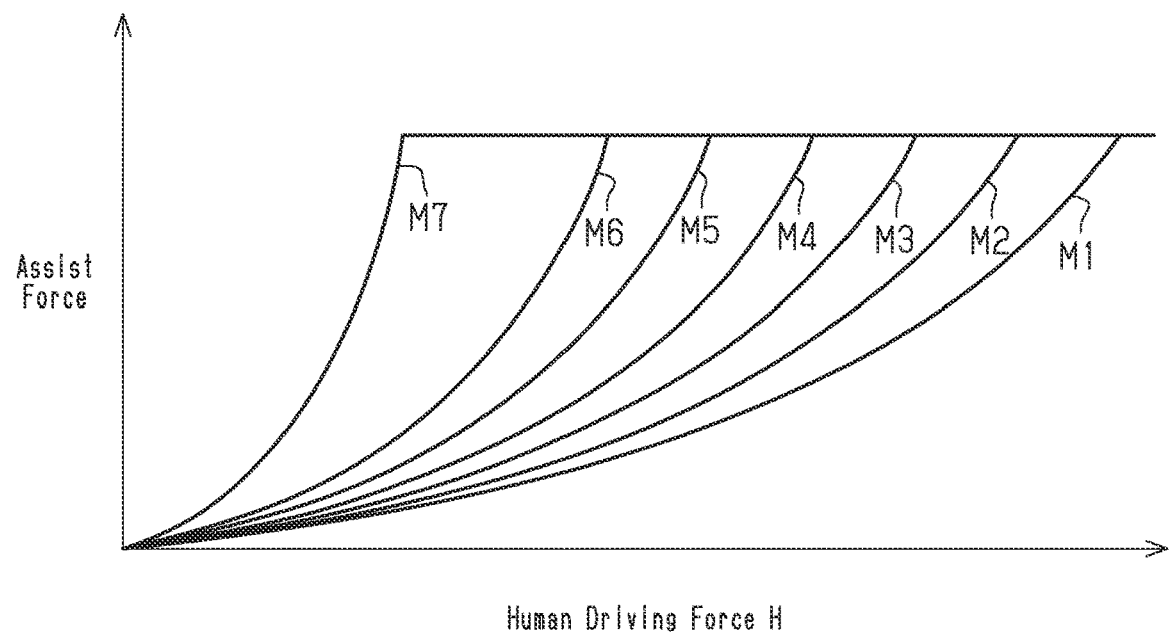
FIG. 7 is a graph showing a first example of control states included in the electronic controller shown in FIG. 2.
Figure 8:
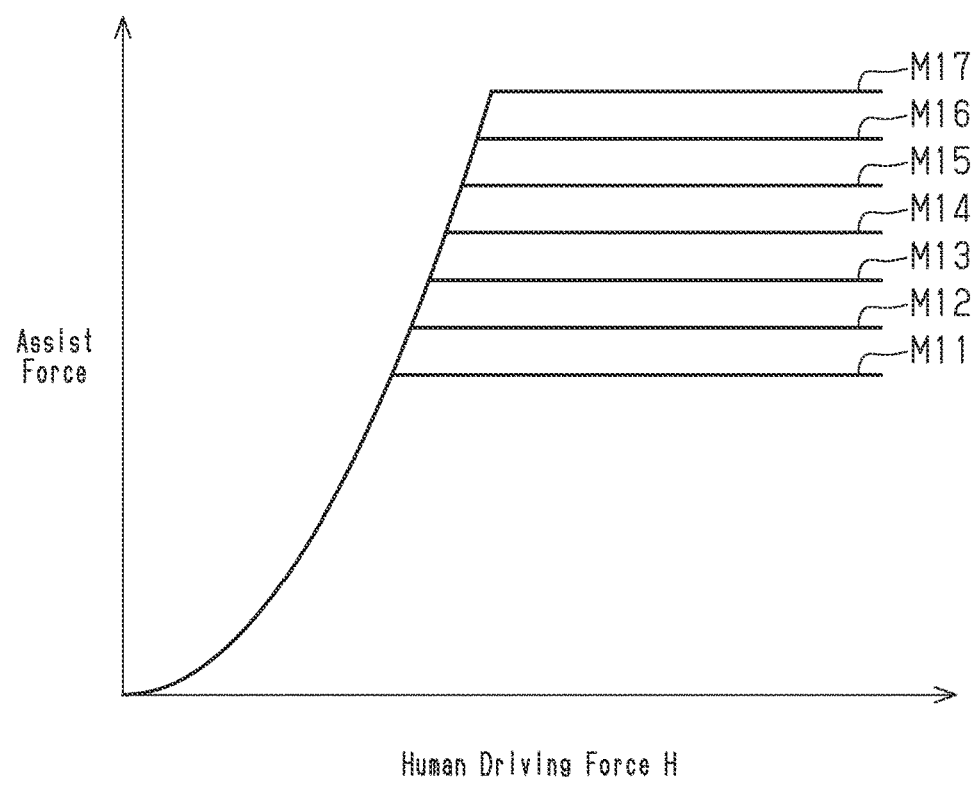
FIG. 8 is a graph showing a second example of control states included in the electronic controller shown in FIG. 2.
Figure 9:
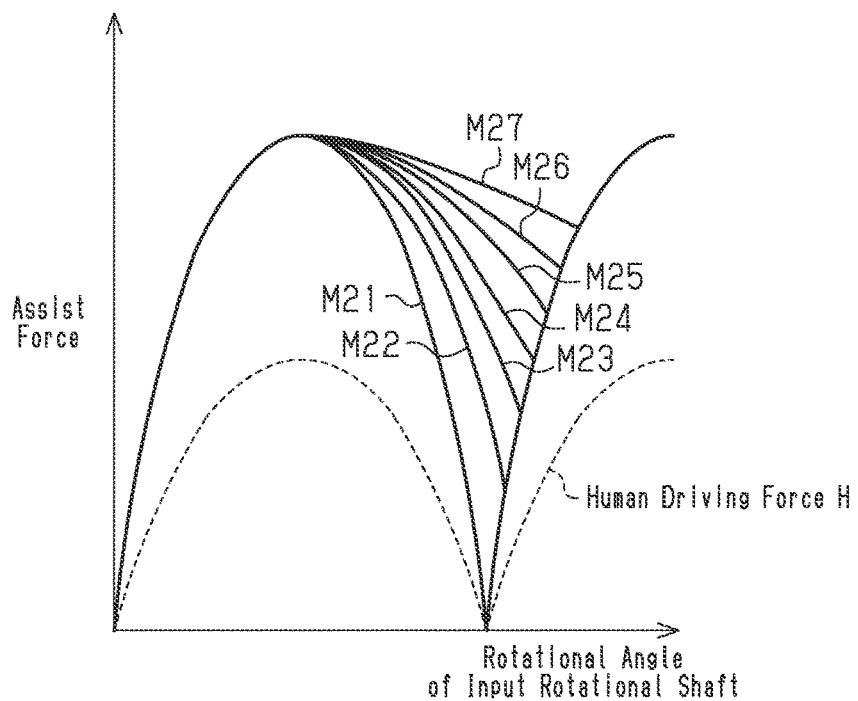
FIG. 9 is a graph showing a third example of control states included in the electronic controller shown in FIG. 2.

FIGS. 7, 8, and 9 show examples of the relationship between the assist force and the human driving force H or the rotational speed C of the input rotational shaft 12A in each control state. The electronic controller 62 is configured to control the motor 38, for example, in accordance with seven control states.

FIG. 7 shows an example of the relationship between the assist force and the human driving force H or the rotational speed C of the input rotational shaft 12A in a case where the electronic controller 62 controls the motor 38 in accordance with seven control states that differ from each other in the maximum assist ratio. In FIG. 7, the horizontal axis shows the human driving force H or the rotational speed C of the input rotational shaft 12A, and the vertical axis shows the assist force. The relationship between the assist force and the human driving force H or the rotational speed C of the input rotational shaft 12A can be, for example, proportional and is not limited to the graph shown in FIG. 7.

In FIG. 7, the control states are shown in a graph provided with reference characters M1 to M7 corresponding to the assist level A. In FIG. 7, the graph corresponding to the control state having the smallest assist level A is denoted by "M1." In FIG. 7, the graph corresponding to the control state having the largest assist level A is denoted by "M7." In FIG. 7, the graph corresponding to the control states excluding the one having the largest assist level A and the one having the smallest assist level A is denoted by "M2", "M3", "M4", "M5", and "M6" in order from ones having smaller assist levels A. The control state having the smallest assist level A corresponds to the minimum mode. The control state having the largest assist level A corresponds to the maximum mode. The control states excluding the control state having the largest assist level A and the control state having the smallest assist level A correspond to intermediate modes. In a case where the electronic controller 62 executes control in accordance with FIG. 7, the control states have the same maximum value MX of assist force. In a case where the electronic controller 62 executes control in accordance with FIG. 7, the control states have the same reducing level R of the output variation of the motor 38.

In a case where the assist level A is expressed as the assist ratio, the assist level A is defined by, for example, the maximum assist ratio excluding a period during which output of the motor 38 is decreasing. In the control state having the largest assist level A, the maximum assist ratio is the largest excluding the period during which output of the motor 38 is decreasing. In the control state having the smallest assist level A, the maximum assist ratio is the smallest excluding the period during which output of the motor 38 is decreasing.

In a case where the electronic controller 62 changes the control state, in addition to one of the assist level A, the maximum value MX of assist force, and the reducing level R of the output variation of the motor 38, the electronic controller 62 can correct output of the motor 38 in accordance with another one or more of the assist level A, the maximum value MX of assist force, and the reducing level R of the output variation of the motor 38. The electronic controller 62 can change the assist level A and the reducing level R of the output variation of the motor 38, for example, in accordance with a change in the control state. The electronic controller 62 can change the assist level A and the maximum value MX of assist force, for example, in accordance with a change in the control state. In FIG. 7, the graph shows each control state in which only the assist level A is changed.

FIG. 8 shows an example of the relationship between the assist force and the human driving force H or the rotational speed C of the input rotational shaft 12A in a case where the electronic controller 62 controls the motor 38 in accordance with seven control states that differ from each other in the maximum value MX of assist force. In FIG. 8, the horizontal axis shows the human driving force H or the rotational speed C of the input rotational shaft 12A, and the vertical axis shows the maximum value MX of assist force.

In FIG. 8, the seven control states are shown in a graph provided with numbers M11 to M17 corresponding to the maximum value MX of assist force. In FIG. 8, the graph corresponding to the smallest maximum value MX of assist force is denoted by "M11." In FIG. 8, the graph corresponding to the largest maximum value MX of assist force is denoted by "M17." In FIG. 8, the graph corresponding to the control states excluding the one having the largest maximum value MX of assist force and the one having the smallest maximum value MX of assist force is denoted by "M12", "M13", "M14", "M15", and "M16" in order from ones having smaller maximum values MX of assist force. The control state having the smallest maximum value MX of assist force corresponds to the minimum mode. The control state having the largest maximum value MX of assist force corresponds to the maximum mode. The control states excluding the control state having the largest maximum value MX of assist force and the control state having the smallest maximum value MX of assist force correspond to intermediate modes. In a case where the electronic controller 62 executes control in accordance with FIG. 8, the control states have the same maximum assist level A. In a case where the electronic controller 62 executes control in accordance with FIG. 8, the control states have the same reducing level R of the output variation of the motor 38.

FIG. 9 shows an example of the relationship between the human driving force H and the assist force in a case where the electronic controller 62 controls the motor 38 in accordance with seven control states that differ from each other in the reducing level R of the output variation of the motor 38. In FIG. 9, the horizontal axis shows the rotational angle of the input rotational shaft 12A, and the vertical axis shows the human driving force H and assist force. FIG. 9 shows a case where the electronic controller 62 does not change the first reducing level R1 and changes the second reducing level R2.

In FIG. 9, the seven control states are shown in a graph provided with numbers M21 to M27 corresponding to the second reducing level R2. In FIG. 9, the graph corresponding to the control state having the smallest second reducing level R2 is denoted by "M21". In FIG. 9, the graph corresponding to the control state having the largest second reducing level R2 is denoted by "M27". In FIG. 9, the graph corresponding to the control states excluding the one having the largest second reducing level R2 and the one having the smallest second reducing level R2 is denoted by "M22", "M23", "M24", "M25", and "M26" in order from ones having smaller second reducing levels R2. The control state having the smallest second reducing level R2 corresponds to the minimum mode. The control state having the largest second reducing level R2 corresponds to the maximum mode. The control states excluding the control state having the largest second reducing level R2 and the control state having the smallest second reducing level R2 correspond to intermediate modes. In a case where the electronic controller 62 executes control in accordance with FIG. 9, the control states have the same maximum assist level A. In a case where the electronic controller 62 executes control in accordance with FIG. 9, the control states have the same maximum value MX of assist force.

The first control state, the second control state, and the third control state are combined differently in accordance with the first control state. In a case where the assist level A is changed in accordance with the control state, the first control state includes the off mode, the minimum mode, and the intermediate modes excluding the one having the largest assist level A. In a case where the maximum value MX of assist force is changed in accordance with the control state, the first control state includes the off mode, the minimum mode, and the intermediate modes excluding the one having the largest maximum value MX of assist force. In a case where the reducing level R of the output variation of the motor 38 is changed in accordance with the control state, the first control state includes the off mode, the minimum mode, and the intermediate modes excluding the one having the largest reducing level R of the output variation of the motor 38. Table 1 shows examples of combinations of a mode corresponding to the first control state, a mode corresponding to the second control state, and a mode corresponding to the third control state in a case where the assist level A is changed in accordance with the control state. Table 2 shows examples of combinations of a mode corresponding to the first control state, a mode corresponding to the second control state, and a mode corresponding to the third control state in a case where the maximum value MX of assist force is changed in accordance with the control state. Table 3 shows examples of combinations of a mode corresponding to the first control state, a mode corresponding to the second control state, and a mode corresponding to the third control state in a case where the reducing level R of the output variation of the motor 38 is changed in accordance with the control state.

TABLE 1

|  | 1st Control State | 2nd Control State | 3rd Control State |
|---|---|---|---|
| 1st Combination for Change in Assist Level A | Off Mode | Minimum Mode | Maximum Mode |
|  | Minimum Mode | Mode having assist level A increased by 1 step from present mode | Maximum Mode |
|  | Intermediate mode excluding mode having largest assist level A | Mode having assist level A increased by 1 step from present mode | Maximum Mode |
| 2nd Combination for Change in Assist Level A | Off Mode | Minimum Mode | Intermediate mode having smallest assist level A |
|  | Minimum Mode | Mode having assist level A increased by 1 step from present mode | Mode having assist level A increased by N steps from present mode where $2 \leq N <$ number of intermediate modes + 1 |
|  | Intermediate mode excluding mode having largest assist level A | Mode having assist level A increased by 1 step from present mode | Mode having assist level A increased by N steps from present mode where $2 \leq N <$ number of modes greater than present mode + 1 |

TABLE 2

|  | 1st Control State | 2nd Control State | 3rd Control State |
|---|---|---|---|
| 1st Combination for Change in Maximum Value MX of Assist Force | Off Mode | Minimum Mode | Maximum Mode |
|  | Minimum Mode | Mode having maximum value MX increased by 1 step from present mode | Maximum Mode |
|  | Intermediate mode excluding mode having largest maximum value MX | Mode having maximum value MX increased by 1 step from present mode | Maximum Mode |
| 2nd Combination for Change in Maximum Value MX of Assist Force | Off Mode | Minimum Mode | Intermediate mode having smallest maximum value MX |
|  | Minimum Mode | Mode having maximum value MX increased by 1 step from present mode | Mode having maximum value MX increased by N steps from present mode where $2 \leq N <$ number of intermediate modes + 1 |
|  | Intermediate mode excluding mode having largest maximum value MX | Mode having maximum value MX increased by 1 step from present mode | Mode having maximum value MX increased by N steps from present mode where $2 \leq N <$ number of modes greater than present mode + 1 |

TABLE 3

|  | 1st Control State | 2nd Control State | 3rd Control State |
|---|---|---|---|
| 1st Combination for Change in Reducing Level R of Output Variation of Motor | Off Mode | Minimum Mode | Maximum Mode |
|  | Minimum Mode | Mode having reducing level R increased by 1 step from present mode | Maximum Mode |

TABLE 3-continued

| | 1st Control State | 2nd Control State | 3rd Control State |
|---|---|---|---|
| | Intermediate mode excluding mode having largest reducing level R | Mode having reducing level R increased by 1 step from present mode | Maximum Mode |
| 2nd Combination for Change in Reducing Level R of Output Variation of Motor | Off Mode | Minimum Mode | Intermediate mode having smallest reducing level R |
| | Minimum Mode | Mode having reducing level R increased by 1 step from present mode | Mode having reducing level R increased by N steps from present mode where 2 ≤ N< number of intermediate modes + 1 |
| | Intermediate mode excluding mode having largest reducing level R | Mode having reducing level R increased by 1 step from present mode | Mode having reducing level R increased by N steps from present mode where 2 ≤ N< number of modes greater than present mode + 1 |

Figure 10:
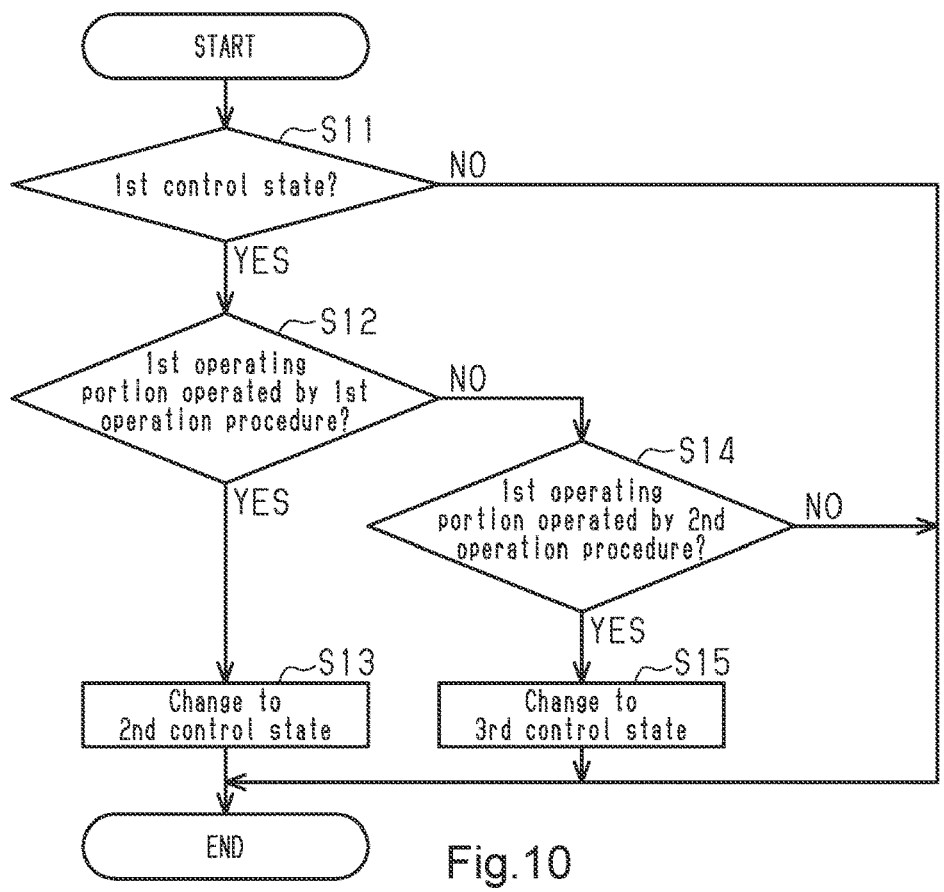
FIG. 10 is a flowchart of a process executed by the electronic controller shown in FIG. 2 for changing the control state in accordance with an operation performed on the first operating portion.

A process for changing the control state in which the electronic controller 62 controls the motor 38 in accordance with an operation performed on the first operating portion 50 will now be described with reference to FIG. 10. For example, in a case where electric power is supplied to the electronic controller 62, the electronic controller 62 starts the process and proceeds to step S11 of the flowchart shown in FIG. 10. In a case where the flowchart shown in FIG. 10 ends, the electronic controller 62 repeats the process from step S11 after a predetermined interval, for example, until the supply of electric power stops.

In step S11, the electronic controller 62 determines whether the control state is the first control state. In a case where the assist level A is changed in accordance with the control state, the electronic controller 62 determines that the control state is a fourth control state in a case where the present mode is the off mode, the minimum mode, or one of the intermediate modes excluding the one having the largest assist level A. In a case where the maximum value MX of assist force is changed in accordance with the control state, the electronic controller 62 determines that the control state is the fourth control state in a case where the present mode is the off mode, the minimum mode, or one of the intermediate modes excluding the one having the largest maximum value MX of assist force. In a case where the reducing level R of the output variation of the motor 38 is changed in accordance with the control state, the electronic controller 62 determines that the control state is the fourth control state in a case where the present mode is the off mode, the minimum mode, or one of the intermediate modes excluding the one having the largest reducing level R of the output variation of the motor 38. In a case where the control state is not the first control state, the electronic controller 62 ends the process. In a case where the control state is the first control state, the electronic controller 62 proceeds to step S12.

In step S12, the electronic controller 62 determines whether the first operating portion 50 is operated in accordance with the first operation procedure. In a case where the first operating portion 50 is operated in accordance with the first operation procedure, the electronic controller 62 proceeds to step S13. In step S13, the electronic controller 62 changes the control state to the second control state and ends the process.

In step S12, in a case where the first operating portion 50 is not operated in accordance with the first operation procedure, the electronic controller 62 proceeds to step S14. In step S14, the electronic controller 62 determines whether the first operating portion 50 is operated in accordance with the second operation procedure. In a case where the first operating portion 50 is not operated in accordance with the second operation procedure, the electronic controller 62 ends the process. In a case where the first operating portion 50 is operated in accordance with the second operation procedure, the electronic controller 62 proceeds to step S15.

In step S15, the electronic controller 62 changes the control state to the third control state and ends the process. In a case where the third control state includes multiple control states, in step S15, the electronic controller 62 changes the control state to the control state that is selected in advance and ends the process. In the flowchart shown in FIG. 10, step S11 can be executed between step S12 and step S13 and between step S14 and step S15.

The electronic controller 62 is configured to change the control state of the motor 38 in accordance with an operation performed on the second operating portion 52. The control state includes at least the fourth control state, a fifth control state, and a sixth control state. In the fourth control state, the motor 38 is driven in correspondence with the human driving force H. In the fifth control state, the motor 38 is driven in correspondence with the human driving force H. The fifth control state differs from the fourth control state. The sixth control state differs from the fourth control state and the fifth control state.

Preferably, the sixth control state includes control states that differ from each other in at least one of the assist level A, the maximum value MX of assist force, and the reducing level R of the output variation of the motor 38.

In a case where the second operating portion 52 is operated in accordance with a third operation procedure in the fourth control state, the electronic controller 62 changes the control state from the fourth control state to the fifth control state. In a case where the second operating portion 52 is operated in accordance with a fourth operation procedure that differs from the third operation procedure in the fourth control state, the electronic controller 62 changes the control state from the fourth control state to the sixth control state.

Preferably, the third operation procedure includes operating the second operating portion 52 once for an operating time T that is within a predetermined fifth time T5. The fourth operation procedure includes at least one of operating the second operating portion 52 once for an operating time T that exceeds the predetermined fifth time T5, operating the second operating portion 52 a number of times within a predetermined sixth time T6, and within a predetermined seventh time T7, operating the second operating portion 52 once for the operating time T that is within the predetermined fifth time T5 and operating the second operating portion 52 once for the operating time T that exceeds the predetermined fifth time T5.

For example, in a case where the second operating portion 52 is not operated by the user, a third signal is input to the electronic controller 62 from the second operating portion 52. While the second operating portion 52 is being operated, a fourth signal is input to the electronic controller 62 from the second operating portion 52. In a case where the second operating portion 52 includes a normally open switch, the third signal is a deactivation signal, and the fourth signal is an activation signal. For example, the third signal is expressed as a direct current voltage having a voltage value that is less than a predetermined voltage. For example, the fourth signal is expressed as a direct current voltage having a voltage value that is greater than the predetermined voltage.

Preferably, the predetermined fifth time T5 is equal to the first predetermined time T1. The predetermined fifth time T5 can differ from the first predetermined time T1. The predetermined fifth time T5 is, for example, included in a range from 0.2 seconds to 1 seconds. Preferably, the predetermined sixth time T6 is equal to the predetermined second time T2. The predetermined sixth time T6 can differ from the predetermined second time T2. The predetermined sixth time T6 is, for example, included in a range from 0.2 seconds to 2 seconds. Preferably, the predetermined seventh time T7 is equal to the predetermined third time T3. The predetermined seventh time T7 can differ from the predetermined third time T3. The predetermined seventh time T7 is, for example, included in a range from 0.2 seconds to 2 seconds.

Preferably, the third operation procedure is the same as the first operation procedure except that the operation subject is changed from the first operating portion 50 to the second operating portion 52. Preferably, the fourth operation procedure is the same as the second operation procedure except that the operation subject is changed from the first operating portion 50 to the second operating portion 52. The fourth operation procedure is the same as the second operation procedure except that the operation subject is changed from the first operating portion 50 to the second operating portion 52.

Preferably, the electronic controller 62 controls the motor 38 so that the assist level A in the sixth control state is less than the assist level A in the fifth control state in a case where the electronic controller 62 changes the assist level A in accordance with the control state. Preferably, the electronic controller 62 controls the motor 38 so that the maximum value MX of assist force in the sixth control state is less than the maximum value MX of assist force in the fifth control state in a case where the electronic controller 62 changes the maximum value MX of assist force in accordance with the control state. Preferably, the electronic controller 62 controls the motor 38 so that the reducing level R of the output variation of the motor 38 in the sixth control state is less than the reducing level R of the output variation of the motor 38 in the fifth control state in a case where the electronic controller 62 changes the reducing level R of the output variation of the motor 38 in accordance with the control state.

The sixth control state can include control states that differ from each other in at least one of the assist level A, the maximum value MX of assist force, and the reducing level R of the output variation of the motor 38. In a case where the sixth control state includes the control states and the second operating portion 52 is operated in accordance with the third operation procedure in the fourth control state, the electronic controller 62 changes the control state from the fourth control state to one of the control states included in the sixth control state.

Preferably, the one of the control states included in the sixth control state is selected in advance from the control states included in the sixth control state. For example, the control state selected in advance is stored in the storage 64.

Preferably, the one of the control states included in the sixth control state is the one of the control states included in the sixth control state in which the at least one of the assist level A, the maximum value MX of the assist force, and the reducing level R of the output variation of the motor 38 is the smallest. The one of the control states included in the sixth control state can be the off mode.

The fourth control state, the fifth control state, and the sixth control state are combined differently in accordance with the fourth control state. In a case where the assist level A is changed in accordance with the control state, the fourth control state includes the maximum mode and the intermediate modes excluding the one having the smallest assist level A. In a case where the maximum value MX of assist force is changed in accordance with the control state, the fourth control state includes the maximum mode and the intermediate modes excluding the one having the smallest maximum value MX of assist force. In a case where the reducing level R of the output variation of the motor 38 is changed in accordance with the control state, the fourth control state includes the maximum mode and the intermediate modes excluding the one having the smallest reducing level R of the output variation of the motor 38. Table 4 shows examples of combinations of a mode corresponding to the fourth control state, a mode corresponding to the fifth control state, and a mode corresponding to the sixth control state in a case where the assist level A is changed in accordance with the control state. Table 5 shows examples of combinations of a mode corresponding to the fourth control state, a mode corresponding to the fifth control state, and a mode corresponding to the sixth control state in a case where the maximum value MX of assist force is changed in accordance with the control state. Table 6 shows examples of combinations of a mode corresponding to the fourth control state, a mode corresponding to the fifth control state, and a mode corresponding to the sixth control state in a case where the reducing level R of the output variation of the motor 38 is changed in accordance with the control state.

TABLE 4

| | 4th Control State | 5th Control State | 6th Control State |
|---|---|---|---|
| 1st Combination for Change in Assist Level A | Maximum Mode | Mode having assist level A decreased by 1 step from present mode | Minimum Mode or Off Mode |
| | Intermediate mode excluding mode having smallest assist level A | Mode having assist level A decreased by 1 step from present mode | Minimum Mode or Off Mode |
| 2nd Combination for Change in Assist Level A | Maximum Mode | Mode having assist level A decreased by 1 step from present mode | Off Mode or Mode having assist level A decreased by N steps from present mode where 2 ≤ N< number of intermediate modes + 1 |
| | Intermediate mode excluding mode having smallest assist level A | Mode having assist level A decreased by 1 step from present mode | Off Mode or Mode having assist level A decreased by N steps from present mode where 2 ≤ N< number of modes smaller than present mode + 1 |

TABLE 5

| | 4th Control State | 5th Control State | 6th Control State |
|---|---|---|---|
| 1st Combination for Change in Maximum Value MX of Assist Force | Maximum Mode | Mode having maximum value MX decreased by 1 step from present mode | Minimum Mode or Off Mode |
| | Intermediate mode excluding mode having smallest maximum value MX | Mode having maximum value MX decreased by 1 step from present mode | Minimum Mode or Off Mode |
| 2nd Combination for Change in Maximum Value MX of Assist Force | Maximum Mode | Mode having maximum value MX decreased by 1 step from present mode | Off Mode or Mode having maximum value MX decreased by N steps from present mode where 2 ≤ N< number of intermediate modes + 1 |
| | Intermediate mode excluding mode having smallest maximum value MX | Mode having maximum value MX decreased by 1 step from present mode | Off Mode or Mode having maximum value MX decreased by N steps from present mode where 2 ≤ N< number of modes smaller than present mode + 1 |

TABLE 6

| | 4th Control State | 5th Control State | 6th Control State |
|---|---|---|---|
| 1st Combination for Change in Reducing Level R of Output Variation of Motor | Maximum Mode | Mode having reducing level R decreased by 1 step from present mode | Minimum Mode or Off Mode |
| | Intermediate mode excluding mode having smallest reducing level R | Mode having reducing level R decreased by 1 step from present mode | Minimum Mode or Off Mode |
| 2nd Combination for Change in Reducing Level R | Maximum Mode | Mode having reducing level R decreased by 1 step | Off Mode or Mode having reducing level R decreased |

TABLE 6-continued

|  | 4th Control State | 5th Control State | 6th Control State |
|---|---|---|---|
| of Output Variation of Motor |  | from present mode | by N steps from present mode where $2 \leq N <$ number of intermediate modes + 1 |
|  | Intermediate mode excluding mode having smallest reducing level R | Mode having reducing level R decreased by 1 step from present mode | Off Mode or Mode having reducing level R decreased by N steps from present mode where $2 \leq N <$ number of modes having smaller reducing level R than present mode + 1 |

Figure 11:
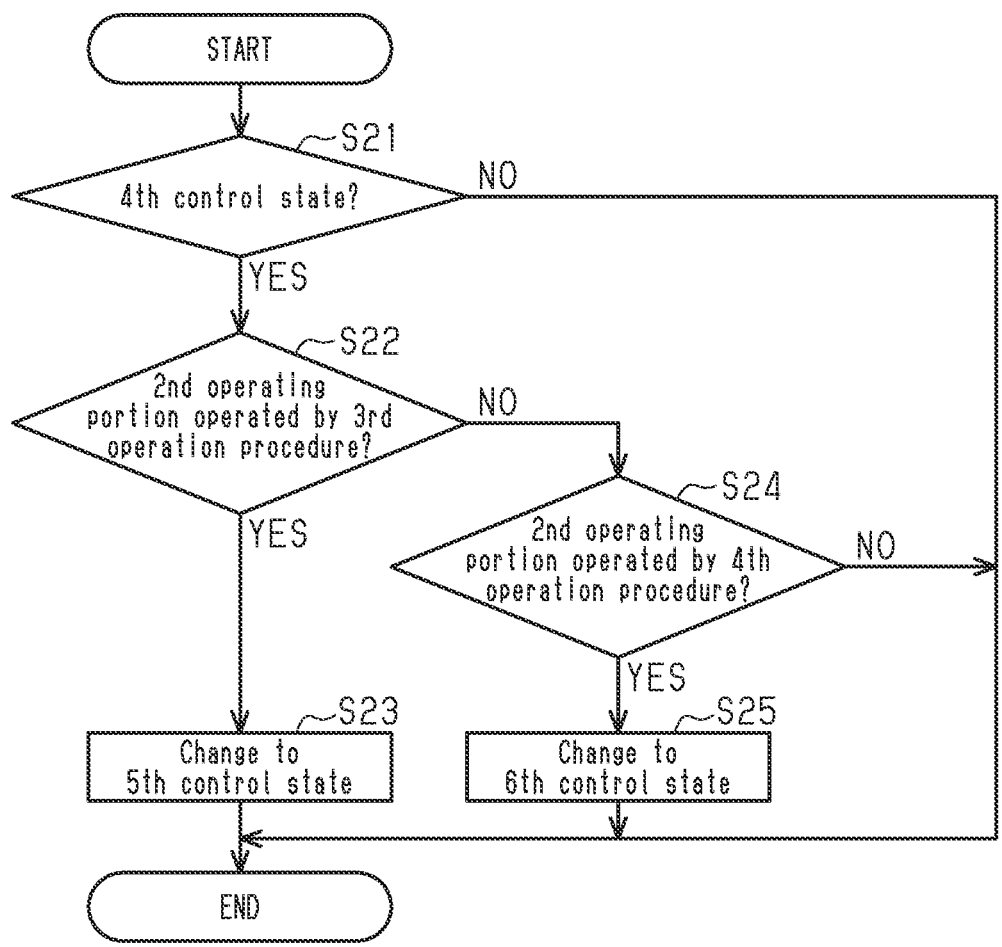
FIG. 11 is a flowchart of a process executed by the electronic controller shown in FIG. 2 for changing the control state in accordance with an operation performed on a second operating portion.

A process for changing the control state in which the electronic controller 62 controls the motor 38 in accordance with an operation performed on the second operating portion 52 will now be described with reference to FIG. 11. For example, in a case where electric power is supplied to the electronic controller 62, the electronic controller 62 starts the process and proceeds to step S21 of the flowchart shown in FIG. 11. In a case where the flowchart shown in FIG. 11 ends, the electronic controller 62 repeats the process from step S21 after a predetermined interval, for example, until the supply of electric power stops.

In step S21, the electronic controller 62 determines whether the control state is the fourth control state. In a case where the assist level A is changed in accordance with the control state, the electronic controller 62 determines that the control state is the fourth control state in a case where the present mode is the off mode, the minimum mode, or one of the intermediate modes excluding the one having the largest assist level A. In a case where the maximum value MX of assist force is changed in accordance with the control state, the electronic controller 62 determines that the control state is the fourth control state in a case where the present mode is the off mode, the minimum mode, or one of the intermediate modes excluding the one having the largest maximum value MX of assist force. In a case where the reducing level R of the output variation of the motor 38 is changed in accordance with the control state, the electronic controller 62 determines that the control state is the fourth control state in a case where the present mode is the off mode, the minimum mode, or one of the intermediate modes excluding the one having the largest reducing level R of the output variation of the motor 38. In a case where the control state is not the fourth control state, the electronic controller 62 ends the process. In a case where the control state is the fourth control state, the electronic controller 62 proceeds to step S22.

In step S22, the electronic controller 62 determines whether the second operating portion 52 is operated in accordance with the third operation procedure. In a case where the second operating portion 52 is operated in accordance with the third operation procedure, the electronic controller 62 proceeds to step S23. In step S23, the electronic controller 62 changes the control state to the fifth control state and ends the process.

In step S22, in a case where the second operating portion 52 is not operated in accordance with the third operation procedure, the electronic controller 62 proceeds to step S24. In step S24, the electronic controller 62 determines whether the second operating portion 52 is operated in accordance with the fourth operation procedure. In a case where the second operating portion 52 is not operated in accordance with the fourth operation procedure, the electronic controller 62 ends the process. In a case where the second operating portion 52 is operated in accordance with the fourth operation procedure, the electronic controller 62 proceeds to step S25.

In step S25, the electronic controller 62 changes the control state to the sixth control state and ends the process. In a case where the sixth control state includes multiple control states, in step S25, the electronic controller 62 changes the control state to the control state that is selected in advance and ends the process. In the flowchart shown in FIG. 11, step S21 can be executed between step S22 and step S23 and between step S24 and step S25.

Second Embodiment

Figure 2:
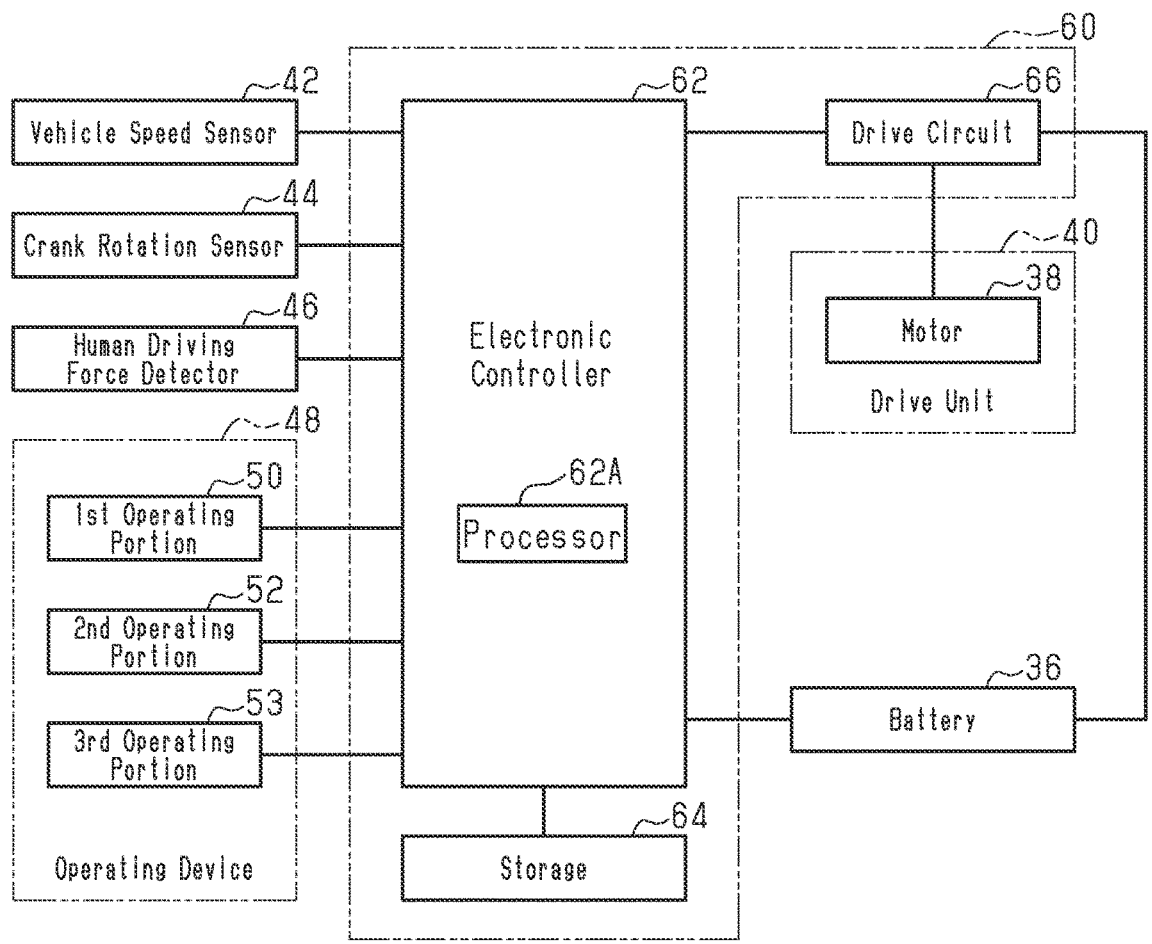
FIG. 2 is a block diagram showing the electrical configuration of the human-powered vehicle including the human-powered vehicle control device of the first embodiment.
Figure 3:
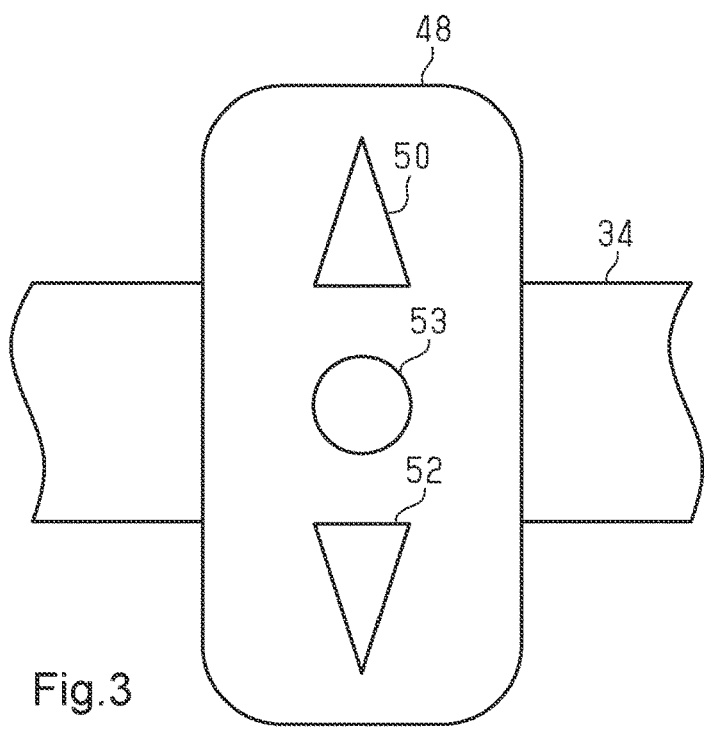
FIG. 3 is a plan view showing the operating device shown in FIG. 2 and a portion of a handlebar.
Figure 12:
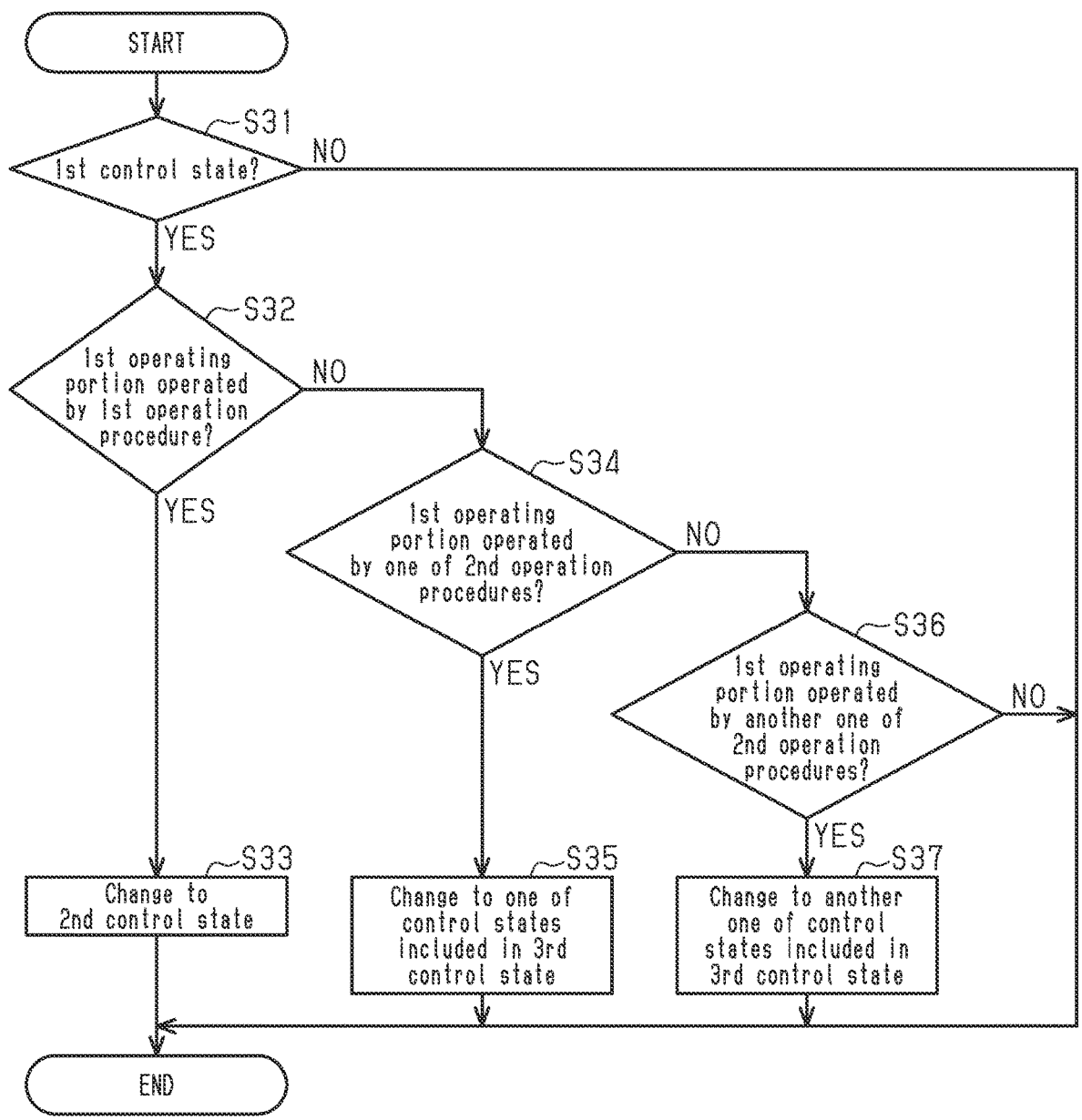
FIG. 12 is a flowchart of a process executed by a second embodiment of an electronic controller for changing the control state in accordance with an operation performed on the first operating portion.
Figure 13:
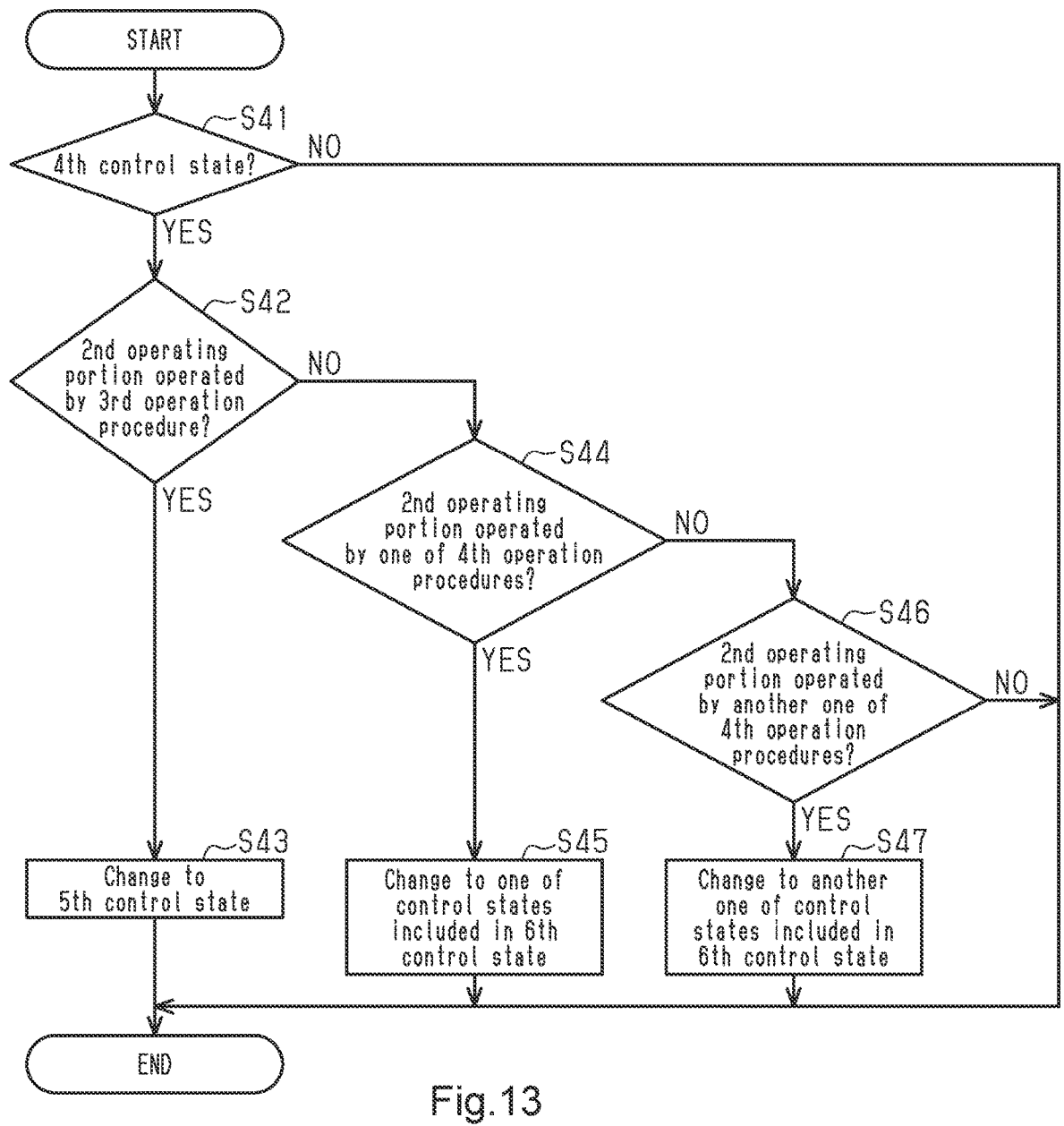
FIG. 13 is a flowchart of a process executed by the electronic controller of the second embodiment for changing the control state in accordance with an operation performed on the second operating portion.

A second embodiment of a human-powered vehicle control device 60 will now be described with reference to FIGS. 2, 12, and 13. The human-powered vehicle control device 60 of the second embodiment has the same configuration as the human-powered vehicle control device 60 of the first embodiment except that the processes of the flowchart shown in FIGS. 12 and 13 are executed instead of the processes of the flowcharts shown in FIGS. 10 and 11. In the human-powered vehicle control device 60 of the second embodiment, same reference characters are given to those elements that are the same as the corresponding elements in the first embodiment. Such elements will not be described in detail.

Preferably, in accordance with one of the operations included in the second operation procedure, the electronic controller 62 changes the control state from the first control state to one of the control states included in the third control state. In accordance with another one of the operations included in the second operation procedure, the electronic controller 62 changes the control state from the first control state to another one of the control states included in the third control state.

Table 7 shows examples of combinations D11, D12, D13, D14, D15, and D16 between one of the operations included in the second operation procedure and another one of the operations included in the second operation procedure. In the second operation procedure, operating the first operating portion 50 once for an operating time T that exceeds the first predetermined time T1 is referred to as operation E11. In the second operation procedure, operating the first operating portion 50 a number of times within the predetermined second time T2 is referred to as operation E12. In the second operation procedure, within the predetermined third time T3, operating the first operating portion 50 once for the operating time T that is within the first predetermined time T1 and operating the first operating portion 50 once for the operating time T that exceeds the first predetermined time T1 is referred to as operation E13.

TABLE 7

| Combination | One of Operations Included in 2nd Operation Procedure | Another One of Operations Included in 2nd Operation Procedure |
| --- | --- | --- |
| D11 | Operation E11 | Operation E12 |
| D12 | Operation E11 | Operation E13 |
| D13 | Operation E12 | Operation E11 |
| D14 | Operation E12 | Operation E13 |
| D15 | Operation E13 | Operation E11 |
| D16 | Operation E13 | Operation E12 |

For example, one of the control states included in the third control state corresponds to a state in which at least one of the assist level A, the maximum value MX of assist force, and the reducing level R of the output variation of the motor 38 is the largest. Another one of the control states included in the third control state corresponds to, for example, a state in which at least one of the assist level A, the maximum value MX of assist force, and the reducing level R of the output variation of the motor 38 is less than the largest. The other one of the control states included in the third control state corresponds to, for example, a mode in which the assist level is greater than the present assist level A by N steps. In this case, N is 2 or greater and less than the number of intermediate modes+1. The other one of the control states included in the third control state corresponds to, for example, a mode in which the maximum value MX of assist force is greater than the maximum value MX of the present assist force by N steps. The other one of the control states included in the third control state corresponds to, for example, a mode in which the reducing level R of the output variation of the motor 38 is greater than the present reducing level R of the output variation of the motor 38 by N steps.

A process for changing the control state in which the electronic controller 62 controls the motor 38 in accordance with an operation performed on the first operating portion 50 will now be described with reference to FIG. 12. For example, in a case where electric power is supplied to the electronic controller 62, the electronic controller 62 starts the process and proceeds to step S31 of the flowchart shown in FIG. 12. In a case where the flowchart shown in FIG. 12 ends, the electronic controller 62 repeats the process from step S31 after a predetermined interval, for example, until the supply of electric power stops.

In step S31, the electronic controller 62 determines whether the control state is the first control state. For example, in the same manner as step S11 shown in FIG. 10, the electronic controller 62 determines whether the control state is the first control state. In a case where the control state is not the first control state, the electronic controller 62 ends the process. In a case where the control state is the first control state, the electronic controller 62 proceeds to step S32.

In step S32, the electronic controller 62 determines whether the first operating portion 50 is operated in accordance with the first operation procedure. In a case where the first operating portion 50 is operated in accordance with the first operation procedure, the electronic controller 62 proceeds to step S33. In step S33, the electronic controller 62 changes the control state to the second control state and ends the process.

In step S32, in a case where the first operating portion 50 is not operated in accordance with the first operation procedure, the electronic controller 62 proceeds to step S34. In step S34, the electronic controller 62 determines whether the first operating portion 50 is operated in accordance with one of the operations in the second operation procedure. In a case where the first operating portion 50 is operated in accordance with the one of the operations in the second operation procedure, the electronic controller 62 proceeds to step S35. In step S35, the electronic controller 62 changes the control state to the one of the control states included in the third control state and ends the process.

In step S34, in a case where the first operating portion 50 is not operated in accordance with the one of the operations in the second operation procedure, the electronic controller 62 proceeds to step S36. In step S36, the electronic controller 62 determines whether the first operating portion 50 is operated in accordance with another one of the operations in the second operation procedure. In a case where the first operating portion 50 is not operated in accordance with the other one of the operations in the second operation procedure, the electronic controller 62 ends the process. In a case where the first operating portion 50 is operated in accordance with the other one of the operations in the second operation procedure, the electronic controller 62 proceeds to step S37. In step S37, the electronic controller 62 changes the control state to another one of the control states included in the third control state and ends the process. In the flowchart shown in FIG. 12, step S31 can be executed between step S32 and step S33, between step S34 and step S35, and between step S36 and step S37.

Preferably, in accordance with one of the operations included in the fourth operation procedure, the electronic controller 62 changes the control state from the fourth control state to the one of the control states included in the sixth control state. In accordance with another one of the operations included in the fourth operation procedure, the electronic controller 62 changes the control state from the fourth control state to another one of the control states included in the sixth control state.

Table 8 shows examples of combinations D21, D22, D23, D24, D25, and D26 between one of the operations included in the fourth operation procedure and another one of the operations included in the fourth operation procedure. In the fourth operation procedure, operating the second operating portion 52 once for the operating time T that exceeds the predetermined fifth time T5 is referred to as operation E21. In the second operation procedure, operating the second operating portion 52 a number of times within the predetermined sixth time T6 is referred to as operation E22. In the second operation procedure, within the predetermined third time T3, operating the second operating portion 52 once for the operating time T that is within the predetermined seventh time T7 and operating the second operating portion 52 once for the operating time T that exceeds the predetermined fifth time T5 is referred to as operation E23.

TABLE 8

| Combination | One of Operations Included in 4th Operation Procedure | Another One of Operations Included in 4th Operation Procedure |
| --- | --- | --- |
| D21 | Operation E21 | Operation E22 |
| D22 | Operation E21 | Operation E23 |
| D23 | Operation E22 | Operation E21 |
| D24 | Operation E22 | Operation E23 |
| D25 | Operation E23 | Operation E21 |
| D26 | Operation E23 | Operation E22 |

For example, one of the control states included in the sixth control state corresponds to a state in which at least one of the assist level A, the maximum value MX of assist force, and the reducing level R of the output variation of the motor 38 is the smallest. Another one of the control states included in the sixth control state corresponds to, for example, a state in which at least one of the assist level A, the maximum value MX of assist force, and the reducing level R of the output variation of the motor 38 is greater than the smallest. The other one of the control states included in the sixth control state corresponds to, for example, a mode in which the assist level is less than the present assist level A by N steps. In this case, N is 2 or greater and less than the number of intermediate modes+1. The other one of the control states included in the sixth control state corresponds to, for example, a mode in which the maximum value MX of assist force is less than the maximum value MX of the present assist force by N steps. The other one of the control states included in the sixth control state corresponds to, for example, a mode in which the reducing level R of the output variation of the motor 38 is less than the present reducing level R of the output variation of the motor 38 by N steps.

A process for changing the control state in which the electronic controller 62 controls the motor 38 in accordance with an operation performed on the second operating portion 52 will now be described with reference to FIG. 13. For example, in a case where electric power is supplied to the electronic controller 62, the electronic controller 62 starts the process and proceeds to step S41 of the flowchart shown in FIG. 13. In a case where the flowchart shown in FIG. 13 ends, the electronic controller 62 repeats the process from step S41 after a predetermined interval, for example, until the supply of electric power stops.

In step S41, the electronic controller 62 determines whether the control state is the fourth control state. For example, in the same manner as step S21 shown in FIG. 11, the electronic controller 62 determines whether the control state is the fourth control state. In a case where the control state is not the fourth control state, the electronic controller 62 ends the process. In a case where the control state is the fourth control state, the electronic controller 62 proceeds to step S42.

In step S42, the electronic controller 62 determines whether the second operating portion 52 is operated in accordance with the fourth operation procedure. In a case where the second operating portion 52 is operated in accordance with the fourth operation procedure, the electronic controller 62 proceeds to step S43. In step S43, the electronic controller 62 changes the control state to the fifth control state and ends the process.

In step S42, in a case where the second operating portion 52 is not operated in accordance with the fourth operation procedure, the electronic controller 62 proceeds to step S44. In step S44, the electronic controller 62 determines whether the second operating portion 52 is operated in accordance with one of the operations in the fourth operation procedure. In a case where the second operating portion 52 is operated in accordance with the one of the operations in the fourth operation procedure, the electronic controller 62 proceeds to step S45. In step S45, the electronic controller 62 changes the control state to the one of the control states included in the sixth control state and ends the process.

In step S44, in a case where the second operating portion 52 is not operated in accordance with the one of the operations in the fourth operation procedure, the electronic controller 62 proceeds to step S46. In step S46, the electronic controller 62 determines whether the second operating portion 52 is operated in accordance with another one of the operations in the fourth operation procedure. In a case where the second operating portion 52 is not operated in accordance with the other one of the operations in the fourth operation procedure, the electronic controller 62 ends the process. In a case where the second operating portion 52 is operated in accordance with the other one of the operations in the fourth operation procedure, the electronic controller 62 proceeds to step S47. In step S47, the electronic controller 62 changes the control state to the other one of the control states included in the sixth control state and ends the process.

In the flowchart shown in FIG. 13, step S41 can be executed between step S42 and step S43, between step S44 and step S45, and between step S46 and step S47.

Third Embodiment

Figure 14:
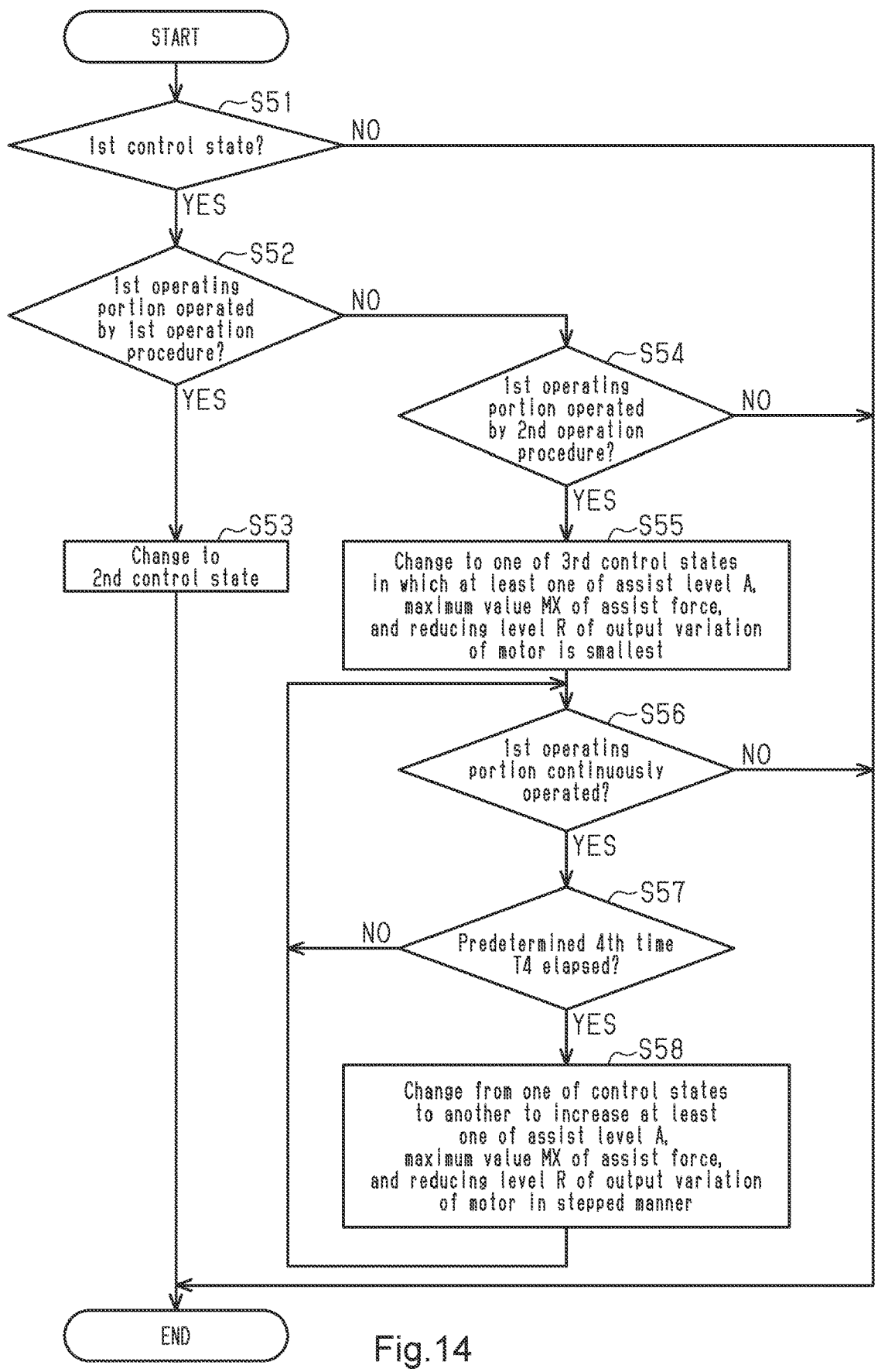
FIG. 14 is a flowchart of a process executed by a third embodiment of an electronic controller for changing the control state in accordance with an operation performed on the first operating portion.
Figure 15:
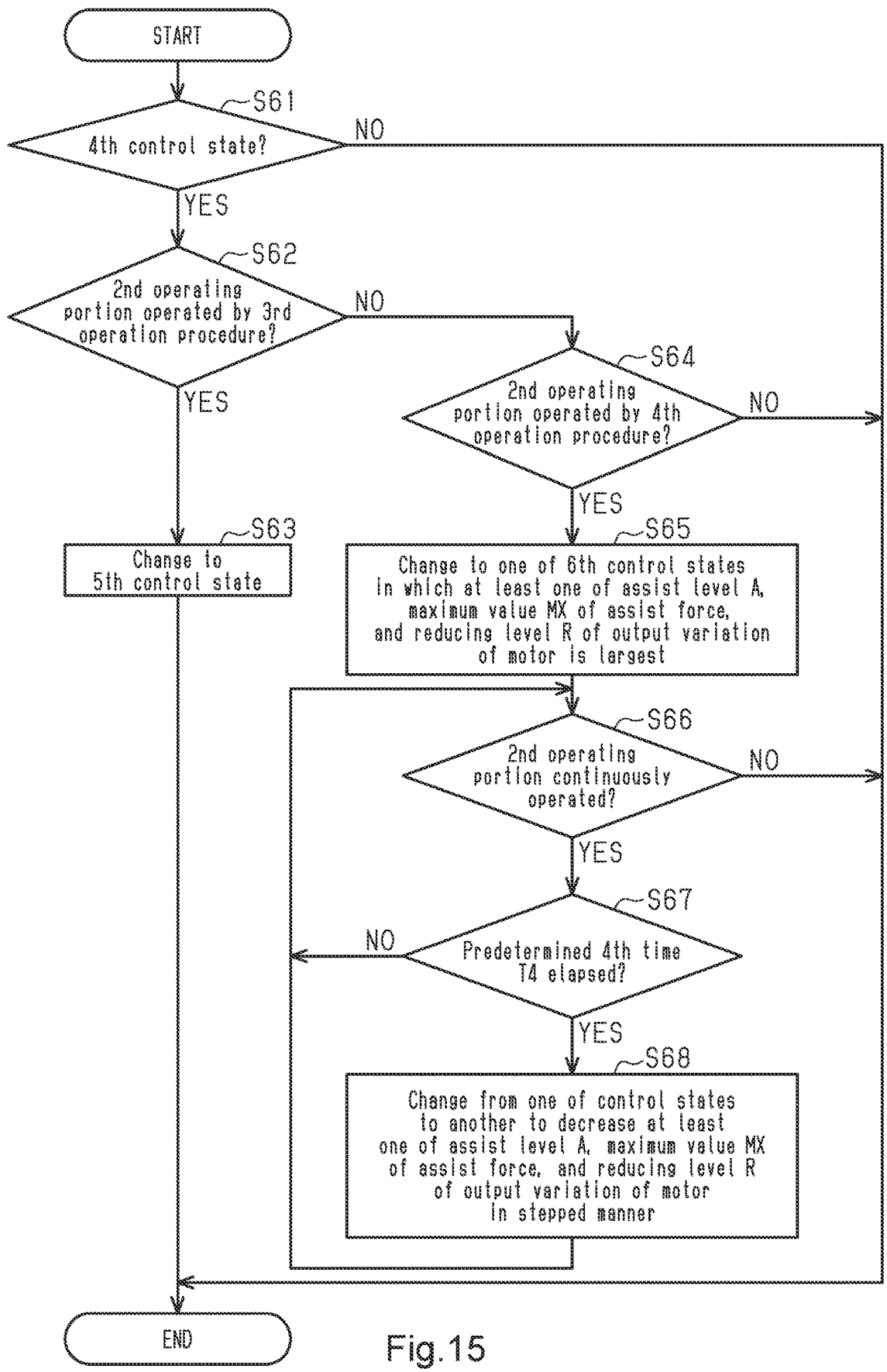
FIG. 15 is a flowchart of a process executed by the electronic controller of the third embodiment for changing the control state in accordance with an operation performed on the second operating portion.

A third embodiment of a human-powered vehicle control device 60 will now be described with reference to FIGS. 2, 7, 8, 14, and 15. The human-powered vehicle control device 60 of the third embodiment has the same configuration as the human-powered vehicle control device 60 of the first embodiment except that the processes of the flowchart shown in FIGS. 14 and 15 are executed instead of the processes of the flowcharts shown in FIGS. 10 and 11. In the human-powered vehicle control device 60 of the third embodiment, same reference characters are given to those elements that are the same as the corresponding elements in the first embodiment. Such elements will not be described in detail.

In a case where the first operating portion 50 is operated once for the operating time T that exceeds the first predetermined time T1 in the first control state, the electronic controller 62 changes the control state from the first control state to one of the control states in the third control state in which at least one of the assist level A, the maximum value MX of assist force, and the reducing level R of the output variation of the motor 38 is the smallest. In a case where the first operating portion 50 is continuously operated after changing the control state to the one of the control states in the third control state in which at least one of the assist level A, the maximum value MX of assist force, and the reducing level R of the output variation of the motor 38 is the smallest, the electronic controller 62 changes the control state from the one of the control states to another one of the control states to increase at least one of the assist level A, the maximum value MX of assist force, and the reducing level R of the output variation of the motor 38 in a stepped manner whenever a predetermined fourth time T4 elapses. Preferably, the predetermined fourth time T4 is greater than zero and less than or equal to the first predetermined time T1.

A process for changing the control state in which the electronic controller 62 controls the motor 38 in accordance with an operation performed on the first operating portion 50 will now be described with reference to FIG. 14. For example, in a case where electric power is supplied to the electronic controller 62, the electronic controller 62 starts the process and proceeds to step S51 of the flowchart shown in FIG. 14. In a case where the flowchart shown in FIG. 14 ends, the electronic controller 62 repeats the process from step S51 after a predetermined interval, for example, until the supply of electric power stops.

In step S51, the electronic controller 62 determines whether the control state is the first control state. For example, in the same manner as step S11 shown in FIG. 10, the electronic controller 62 determines whether the control state is the first control state. In a case where the control state is not the first control state, the electronic controller 62 ends the process. In a case where the control state is the first control state, the electronic controller 62 proceeds to step S52. In step S52, the electronic controller 62 determines whether the first operating portion 50 is operated in accordance with the first operation procedure. In a case where the first operating portion 50 is operated in accordance with the first operation procedure, the electronic controller 62 proceeds to step S53. In step S53, the electronic controller 62 changes the control state to the second control state and ends the process.

In step S52, in a case where the first operating portion 50 is not operated in accordance with the first operation procedure, the electronic controller 62 proceeds to step S54. In step S54, the electronic controller 62 determines whether the first operating portion 50 is operated in accordance with the second operation procedure. In a case where the first operating portion 50 is not operated in accordance with the second operation procedure, the electronic controller 62 ends the process. In a case where the first operating portion 50 is operated in accordance with the second operation procedure, the electronic controller 62 proceeds to step S55.

In step S55, the electronic controller 62 changes the control state to one of the control states in the third control state in which at least one of the assist level A, the maximum value MX of assist force, and the reducing level R of the output variation of the motor 38 is the smallest and proceeds to step S56. In step S56, the electronic controller 62 determines whether the first operating portion 50 is continuously operated. In a case where the first operating portion 50 is not continuously operated, the electronic controller 62 ends the process. In a case where the first operating portion 50 is continuously operated, the electronic controller 62 proceeds to step S57.

In step S57, the electronic controller 62 determines whether the predetermined fourth time T4 has elapsed. For example, in a case where the time elapsed from the time of executing step S54 or S55 is greater than or equal to the predetermined fourth time T4, the electronic controller 62 determines that the predetermined fourth time T4 has elapsed. In a case where the predetermined fourth time T4 has not elapsed, the electronic controller 62 proceeds to step S56. In a case where the predetermined fourth time T4 has elapsed, the electronic controller 62 proceeds to step S58.

In step S58, the electronic controller 62 changes the control state from one of the control states to another one of the control states to increase at least one of the assist level A, the maximum value MX of assist force, and the reducing level R of the output variation of the motor 38 in a stepped manner and ends the process. In step S58, in a case where at least one of the assist level A, the maximum value MX of assist force, and the reducing level R of the output variation of the motor 38 is the largest in the control state, the electronic controller 62 ends the process without changing the control state.

In a case where the second operating portion 52 is operated once for the operating time T that exceeds the predetermined fifth time T5 in the fourth control state, the electronic controller 62 changes the control state from the fourth control state to one of the control states in the sixth control state in which at least one of the assist level A, the maximum value MX of assist force, and the reducing level R of the output variation of the motor 38 is the largest. In a case where the second operating portion 52 is continuously operated after changing the control state to the one of the control states in the fourth control state in which at least one of the assist level A, the maximum value MX of assist force, and the reducing level R of the output variation of the motor 38 is the largest, the electronic controller 62 changes the control state from the one of the control states to another one of the control states to decrease at least one of the assist level A, the maximum value MX of assist force, and the reducing level R of the output variation of the motor 38 in a stepped manner whenever a predetermined eighth time T8 elapses. Preferably, the predetermined eighth time T8 is greater than zero and less than or equal to the predetermined fifth time T5.

A process for changing the control state in which the electronic controller 62 controls the motor 38 in accordance with an operation performed on the second operating portion 52 will now be described with reference to FIG. 15. For example, in a case where electric power is supplied to the electronic controller 62, the electronic controller 62 starts the process and proceeds to step S61 of the flowchart shown in FIG. 15. In a case where the flowchart shown in FIG. 15 ends, the electronic controller 62 repeats the process from step S61 after a predetermined interval, for example, until the supply of electric power stops.

In step S61, the electronic controller 62 determines whether the control state is the fourth control state. For example, in the same manner as step S21 shown in FIG. 11, the electronic controller 62 determines whether the control state is the fourth control state. In a case where the control state is not the fourth control state, the electronic controller 62 ends the process. In a case where the control state is the fourth control state, the electronic controller 62 proceeds to step S62. In step S62, the electronic controller 62 determines whether the second operating portion 52 is operated in accordance with the third operation procedure. In a case where the second operating portion 52 is operated in accordance with the third operation procedure, the electronic controller 62 proceeds to step S63. In step S63, the electronic controller 62 changes the control state to the fifth control state and ends the process.

In step S62, in a case where the second operating portion 52 is not operated in accordance with the third operation procedure, the electronic controller 62 proceeds to step S64. In step S64, the electronic controller 62 determines whether the second operating portion 52 is operated in accordance with the fourth operation procedure. In a case where the second operating portion 52 is not operated in accordance with the fourth operation procedure, the electronic controller 62 ends the process. In a case where the second operating portion 52 is operated in accordance with the fourth operation procedure, the electronic controller 62 proceeds to step S65.

In step S65, the electronic controller 62 changes the control state to one of the control states in the sixth control state in which at least one of the assist level A, the maximum value MX of assist force, and the reducing level R of the output variation of the motor 38 is the largest and proceeds to step S66. In step S66, the electronic controller 62 determines whether the second operating portion 52 is continuously operated. In a case where the second operating portion 52 is not continuously operated, the electronic controller 62 ends the process. In a case where the second operating portion 52 is continuously operated, the electronic controller 62 proceeds to step S67.

In step S67, the electronic controller 62 determines whether the predetermined fourth time T4 has elapsed. For example, in a case where the time elapsed from the time of executing step S64 or S65 is greater than or equal to the predetermined fourth time T4, the electronic controller 62 determines that the predetermined fourth time T4 has elapsed. In a case where the predetermined fourth time T4 has not elapsed, the electronic controller 62 proceeds to step S66. In a case where the predetermined fourth time T4 has elapsed, the electronic controller 62 proceeds to step S68.

In step S68, the electronic controller 62 changes the control state from one of the control states to another one of the control states to decrease at least one of the assist level A, the maximum value MX of assist force, and the reducing level R of the output variation of the motor 38 in a stepped manner and ends the process. In step S68, in a case where at least one of the assist level A, the maximum value MX of assist force, and the reducing level R of the output variation of the motor 38 is the smallest in the control state, the electronic controller 62 ends the process without changing the control state.

Fourth Embodiment

Figure 16:
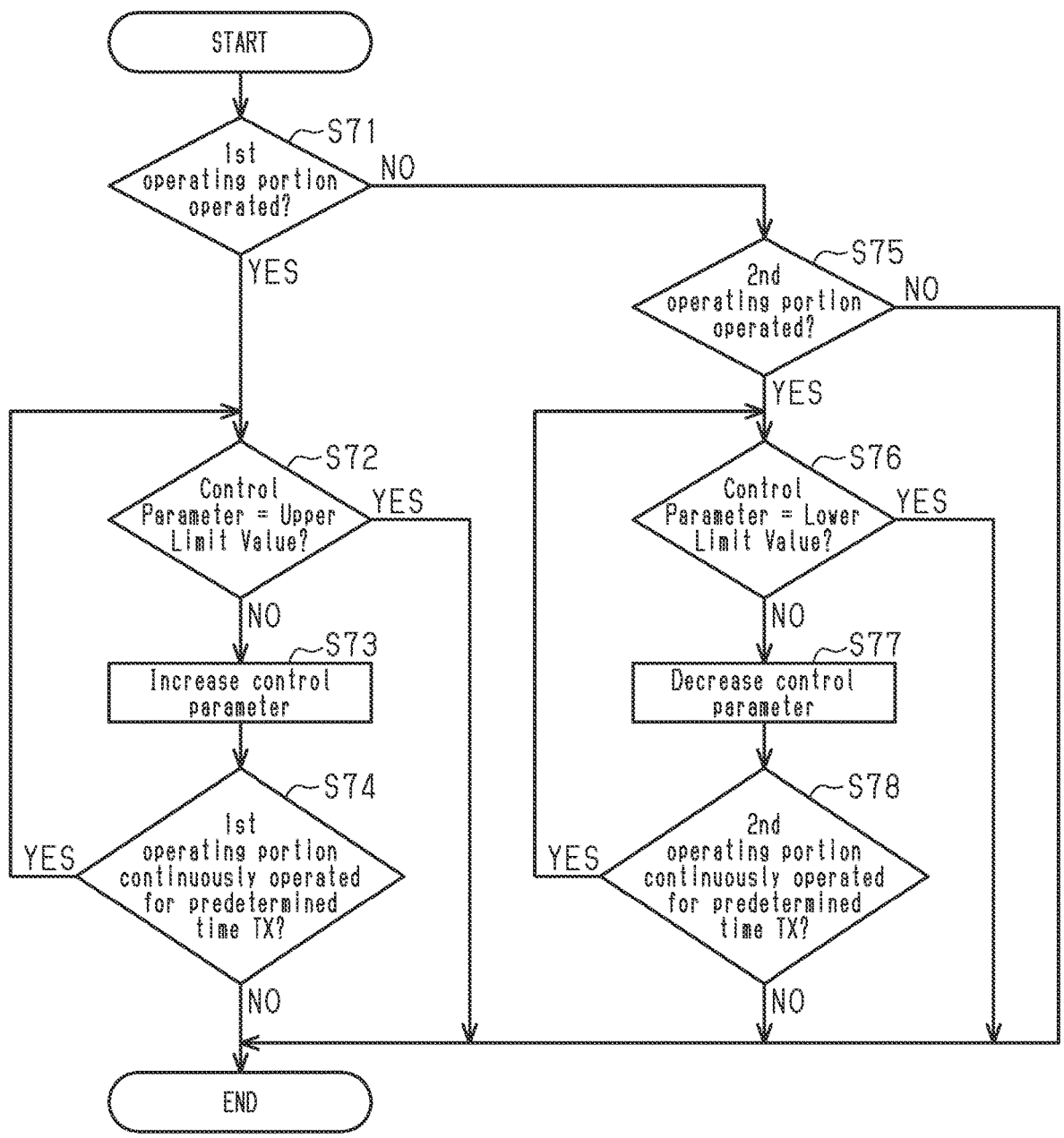
FIG. 16 is a flowchart of a process executed by a fourth embodiment of an electronic controller for changing the control state in accordance with an operation performed on the operating device.
Figure 17:
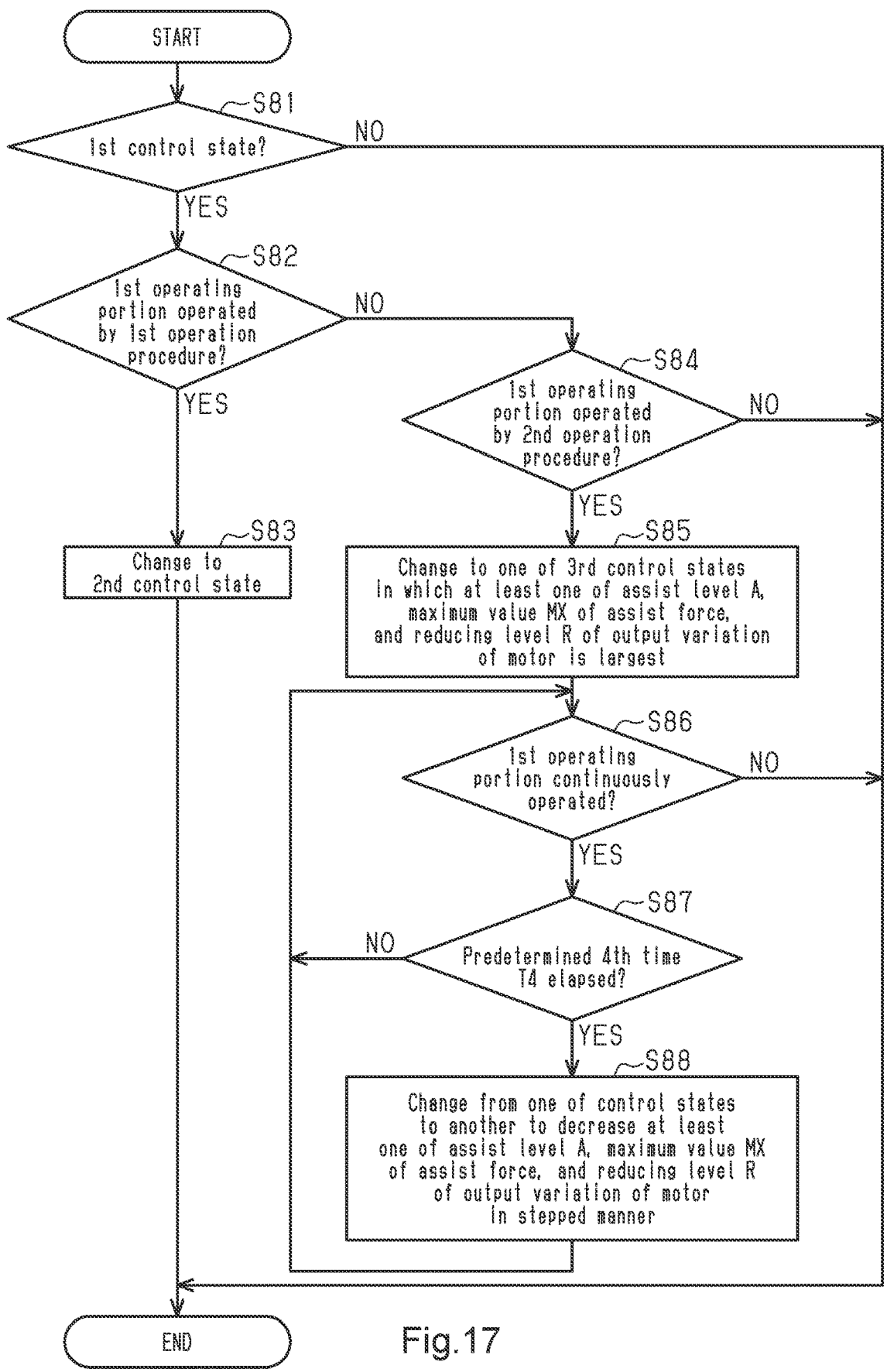
FIG. 17 is a flowchart of a process executed by a modification of an electronic controller for changing the control state in accordance with an operation performed on the first operating portion.

A fourth embodiment of a human-powered vehicle control device 60 will now be described with reference to FIGS. 2, 16, and 17. The human-powered vehicle control device 60 of the fourth embodiment has the same configuration as the human-powered vehicle control device 60 of the first embodiment except that the processes of the flowchart shown in FIGS. 16 and 17 are executed instead of the processes of the flowcharts shown in FIGS. 10 and 11. In the human-powered vehicle control device 60 of the fourth embodiment, same reference characters are given to those elements that are the same as the corresponding elements in the first embodiment. Such elements will not be described in detail.

The electronic controller 62 is configured to control the motor 38 in correspondence with a control parameter related to the motor 38 and the human driving force H input to the human-powered vehicle 10. The electronic controller 62 increases a changing amount of the control parameter as the operating time T for operating the operating device 48 once becomes longer. Preferably, the electronic controller 62 is configured to change the control parameter in a stepped manner.

Preferably, the operating device 48 includes the first operating portion 50 and the second operating portion 52, and the electronic controller 62 increases the control parameter as an operating time T for operating the first operating portion 50 of the operating device 48 once becomes longer, and decreases the control parameter as an operating time T for operating the second operating portion 52 of the operating device 48 once becomes longer. For example, the electronic controller 62 increases the control parameter whenever the time for operating the first operating portion 50 once exceeds a predetermined time TX. For example, the electronic controller 62 decreases the control parameter whenever the time for operating the second operating portion 52 once exceeds the predetermined time TX. The predetermined time TX is, for example, included in a range from 0.2 seconds to one second.

Preferably, the control parameter includes at least one of the assist level A of the motor 38, the maximum value MX of assist force of the motor 38, and the reducing level R of the output variation of the motor 38 with respect to a change in human driving force.

A process for changing the control state in which the electronic controller 62 controls the motor 38 in accordance with an operation performed on the operating device 48 will now be described with reference to FIG. 16. For example, in a case where electric power is supplied to the electronic controller 62, the electronic controller 62 starts the process and proceeds to step S71 of the flowchart shown in FIG. 16. In a case where the flowchart shown in FIG. 16 ends, the electronic controller 62 repeats the process from step S71 after a predetermined interval, for example, until the supply of electric power stops.

In step S71, the electronic controller 62 determines whether the first operating portion 50 is operated. In a case where the first operating portion 50 is operated, the electronic controller 62 proceeds to step S72. In step S72, the electronic controller 62 determines whether the control parameter is equal to an upper limit value. In a case where the control parameter is equal to the upper limit value, the electronic controller 62 ends the process. In a case where the control parameter is not equal to the upper limit value, the electronic controller 62 proceeds to step S73.

In step S73, the electronic controller 62 increases the control parameter and then proceeds to step S74. In step S74, the electronic controller 62 determines whether the first operating portion 50 is continuously operated for the predetermined time TX. For example, in a case where the time elapsed after executing step S72 or S73 is greater than or equal to the predetermined time TX, the electronic controller 62 determines that the first operating portion 50 is continuously operated for the predetermined time TX. In a case where the first operating portion 50 is continuously operated for the predetermined time TX, the electronic controller 62 proceeds to step S72. In a case where the first operating portion 50 is not continuously operated for the predetermined time TX, the electronic controller 62 ends the process.

In step S71, in a case where the first operating portion 50 is not operated, the electronic controller 62 proceeds to step S75. In step S75, the electronic controller 62 determines whether the second operating portion 52 is operated. In a case where the second operating portion 52 is not operated, the electronic controller 62 ends the process. In a case where the second operating portion 52 is operated, the electronic controller 62 proceeds to step S76. In step S76, the electronic controller 62 determines whether the control parameter is equal to a lower limit value. In a case where the control parameter is equal to the lower limit value, the electronic controller 62 ends the process. In a case where the control parameter is not equal to the lower limit value, the electronic controller 62 proceeds to step S77.

In step S77, the electronic controller 62 decreases the control parameter and then proceeds to step S78. In step S78, the electronic controller 62 determines whether the second operating portion 52 is continuously operated for the predetermined time TX. For example, in a case where the time elapsed after executing step S76 or S77 is greater than or equal to the predetermined time TX, the electronic controller 62 determines that the second operating portion 52 is continuously operated for the predetermined time TX. In a case where the second operating portion 52 is continuously operated for the predetermined time TX, the electronic controller 62 proceeds to step S76. In a case where the second operating portion 52 is not continuously operated for the predetermined time TX, the electronic controller 62 ends the process.

Modifications

The description related to the above embodiments exemplifies, without any intention to limit, applicable forms of a human-powered vehicle control device for a human-powered vehicle according to the present disclosure. The human-powered vehicle control device for a human-powered vehicle according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiment. Such elements will not be described in detail.

The electronic controller 62 can be configured to control the motor 38 so that the assist level A in the third control state is less than the assist level A in the second control state in a case where the electronic controller 62 changes the assist level A in accordance with the control state.

The electronic controller 62 can be configured to control the motor 38 so that the maximum value MX of assist force in the third control state is less than the maximum value MX of assist force in the second control state in a case where the electronic controller 62 changes the maximum value MX of assist force in accordance with the control state.

The electronic controller 62 can be configured to control the motor 38 so that the reducing level R of the output variation of the motor 38 in the third control state is less than the reducing level R of the output variation of the motor 38 in the second control state in a case where the electronic controller 62 changes the reducing level R of the output variation of the motor 38 in accordance with the control state. For example, in a case where the electronic controller 62 changes the assist level A and the reducing level R of the output variation of the motor 38 in accordance with the control state, the electronic controller 62 can be configured to control the motor 38 so that the assist level A in the third control state is greater than the assist level A in the second control state and that the reducing level R of the output variation of the motor 38 in the third control state is less than the reducing level R of the output variation of the motor 38 in the second control state. For example, in a case where the electronic controller 62 changes the maximum value MX of assist force and the reducing level R of the output variation of the motor 38 in accordance with the control state, the electronic controller 62 can be configured to control the motor 38 so that the maximum value MX of assist force in the third control state is greater than the maximum value MX of assist force in the second control state and that the reducing level R of the output variation of the motor 38 in the third control state is less than the reducing level R of the output variation of the motor 38 in the second control state.

In a case where at least one of the assist level A, the maximum value MX of assist force, and the reducing level R of the output variation of the motor 38 in the third control state is less than in the second control state, the one of the control states included in the third control state can be the one of the control states included in the third control state in which the at least one of the assist level A, the maximum value MX of the assist force, and the reducing level R of the output variation of the motor 38 is the smallest.

In a case where the first operating portion 50 is operated once for the operating time T that exceeds the first predetermined time T1 in the first control state, the electronic controller 62 can be configured to change the control state from the first control state to one of the control states in the third control state in which at least one of the assist level A, the maximum value MX of assist force, and the reducing level R of the output variation of the motor 38 is the largest. In this case, in a case where the first operating portion 50 is continuously operated after changing the control state to the one of the control states in the third control state in which at least one of the assist level A, the maximum value MX of assist force, and the reducing level R of the output variation of the motor 38 is the largest, the electronic controller 62 can be configured to change the control state from the one of the control states to another one of the control states to decrease at least one of the assist level A, the maximum value MX of assist force, and the reducing level R of the output variation of the motor 38 in a stepped manner whenever a predetermined fourth time T4 elapses.

A process for changing the control state in which the electronic controller 62 controls the motor 38 in accordance with an operation performed on the first operating portion 50 will now be described with reference to FIG. 17. For example, in a case where electric power is supplied to the electronic controller 62, the electronic controller 62 starts the process and proceeds to step S81 of the flowchart shown in FIG. 17. In a case where the flowchart shown in FIG. 17 ends, the electronic controller 62 repeats the process from step S81 after a predetermined interval, for example, until the supply of electric power stops.

In step S81, the electronic controller 62 determines whether the control state is the first control state. In a case where the control state is not the first control state, the electronic controller 62 ends the process. In a case where the control state is the first control state, the electronic controller 62 proceeds to step S82. In step S82, the electronic controller 62 determines whether the first operating portion 50 is operated in accordance with the first operation procedure. In a case where the first operating portion 50 is operated in accordance with the first operation procedure, the electronic controller 62 proceeds to step S83. In step S83, the electronic controller 62 changes the control state to the second control state and ends the process.

In step S82, in a case where the first operating portion 50 is not operated in accordance with the first operation procedure, the electronic controller 62 proceeds to step S84. In step S84, the electronic controller 62 determines whether the first operating portion 50 is operated in accordance with the second operation procedure. In a case where the first operating portion 50 is not operated in accordance with the second operation procedure, the electronic controller 62 ends the process. In a case where the first operating portion 50 is operated in accordance with the second operation procedure, the electronic controller 62 proceeds to step S85.

In step S85, the electronic controller 62 changes the control state to one of the control states in the third control state in which at least one of the assist level A, the maximum value MX of assist force, and the reducing level R of the output variation of the motor 38 is the largest and proceeds to step S86.

In step S86, the electronic controller 62 determines whether the first operating portion 50 is continuously operated. In a case where the first operating portion 50 is not continuously operated, the electronic controller 62 ends the process. In a case where the first operating portion 50 is continuously operated, the electronic controller 62 proceeds to step S87.

In step S87, the electronic controller 62 determines whether the predetermined fourth time T4 has elapsed. For example, in a case where the time elapsed from the time of executing step S84 or S85 is greater than or equal to the predetermined fourth time T4, the electronic controller 62 determines that the predetermined fourth time T4 has elapsed. In a case where the predetermined fourth time T4 has not elapsed, the electronic controller 62 proceeds to step S86. In a case where the predetermined fourth time T4 has elapsed, the electronic controller 62 proceeds to step S88.

In step S88, the electronic controller 62 changes the control state from one of the control states to another one of the control states to decrease at least one of the assist level A, the maximum value MX of assist force, and the reducing level R of the output variation of the motor 38 in a stepped manner and ends the process. In step S88, in a case where at least one of the assist level A, the maximum value MX of assist force, and the reducing level R of the output variation of the motor 38 is the smallest in the control state, the electronic controller 62 ends the process without changing the control state.

The electronic controller 62 can be configured to notify the present control state with a notification unit. The notification unit is connected to the electronic controller 62 by an electric cable or a wireless communication device. The notification unit includes, for example, an indicator. The notification unit can include, for example, a cycle computer or a smartphone.

The electronic controller 62 and the storage 64 can be configured to allow the user to change the setting of at least one of the first predetermined time T1, the predetermined second time T2, the number of times the first operating portion 50 is operated within the predetermined second time T2, the predetermined third time T3, the predetermined fourth time T4, the predetermined fifth time T5, the predetermined sixth time T6, the number of times that the second operating portion 52 is operated within the predetermined sixth time T6, the predetermined seventh time T7, and the predetermined eighth time T8. For example, the electronic controller 62 is configured to change information stored in the storage 64 in accordance with operation of an external device through an interface provided on the human-powered vehicle control device 60. The external device includes, for example, a personal computer, a tablet computer, or a smartphone.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A human-powered vehicle control device for a human-powered vehicle, the human-powered vehicle control device comprising:
    an electronic controller configured to control a motor that applies a propulsion force to the human-powered vehicle,
    the electronic controller being configured to change a control state of the motor between a plurality of control states in accordance with an operation performed on a first operating portion of an operating device,
    wherein the plurality of control states include
        a first control state,
        a second control state in which the motor is driven in correspondence with a human driving force input to the human-powered vehicle, the second control state differing from the first control state, and
        a third control state in which the motor is driven in correspondence with the human driving force input to the human-powered vehicle, the third control state differing from the first control state and the second control state,
    the electronic controller being further configured to change from the first control state to the second control state in a case where the first operating portion is operated in accordance with a first operation procedure in the first control state, and
    the electronic controller being further configured to change from the first control state to the third control state in a case where the first operating portion is operated in accordance with a second operation procedure that differs from the first operation procedure in the first control state,
    the first operating operation procedure being related to operation caused by a user operating the first operating portion for an operating time that is within a predetermined first time,
    the second operation procedure being related to operation caused by the user operating the first operating portion for an operating time that exceeds the predetermined first time.

2. The human-powered vehicle control device according to claim 1, wherein
    the electronic controller is configured to change at least one of an assist level of the motor, a maximum value of an assist force of the motor, and an amount of output of the motor per unit time in accordance with the control state,
    the electronic controller is configured to control the motor so that the assist level in the third control state is greater than the assist level in the second control state in a case where the electronic controller changes the assist level in accordance with the control state,
    the electronic controller is configured to control the motor so that the maximum value of the assist force in the third control state is greater than the maximum value of the assist force in the second control state in a case where the electronic controller changes the maximum value of the assist force in accordance with the control state, and
    the electronic controller is configured to control the motor so that the amount of output of the motor per unit time in the third control state is greater than the amount of output of the motor per unit time in the second control state in a case where the electronic controller changes the amount of output of the motor per unit time in accordance with the control state.

3. The human-powered vehicle control device according to claim 2, wherein
the third control state includes a plurality of third control states that differ from each other in at least one of the assist level, the maximum value of the assist force, and the amount of output of the motor per unit time and
the electronic controller is configured to change from the first control state to one of the plurality of third control states in a case where the first operating portion is operated in accordance with the second operation procedure in the first control state.

4. The human-powered vehicle control device according to claim 3, wherein
the one of the plurality of third control states is selected in advance from the plurality of third control states.

5. The human-powered vehicle control device according to claim 3, wherein
the one of the plurality of third control states is the third control state in which the at least one of the assist level, the maximum value of the assist force, and the amount of output of the motor per unit time is the greatest in comparison to the other of the plurality of third control states.

6. The human-powered vehicle control device according to claim 1, wherein
the electronic controller is configured to change at least one of an assist level of the motor, a maximum value of an assist force of the motor, and an amount of output of the motor per unit time in accordance with the control state,
the electronic controller is configured to control the motor so that the assist level in the third control state is less than the assist level in the second control state in a case where the electronic controller changes the assist level in accordance with the control state,
the electronic controller is configured to control the motor so that the maximum value of the assist force in the third control state is less than the maximum value of the assist force in the second control state in a case where the electronic controller changes the maximum value of the assist force in accordance with the control state, and
the electronic controller is configured to control the motor so that the amount of output of the motor per unit time in the third control state is less than the amount of output of the motor per unit time in the second control state in a case where the electronic controller changes the amount of output of the motor per unit time in accordance with the control state.

7. The human-powered vehicle control device according to claim 6, wherein
the third control state includes a plurality of third control states that differ from each other in the at least one of the assist level, the maximum value of the assist force, and the amount of output of the motor per unit time and
the electronic controller is configured to change from the first control state to one of the plurality of third control states in a case where the first operating portion is operated in accordance with the second operation procedure in the first control state.

8. The human-powered vehicle control device according to claim 7, wherein
the one of the plurality of third control states is selected in advance from the plurality of third control states.

9. The human-powered vehicle control device according to claim 7, wherein
the one of the plurality of third control states is the one of the plurality of third control states in which the at least one of the assist level, the maximum value of the assist force, and the amount of output of the motor per unit time is the smallest in comparison to the other of the plurality of third control states.

10. The human-powered vehicle control device according to claim 1, wherein
the first operation procedure includes operating the first operating portion once for the operating time that is within the predetermined first time, and
the second operation procedure includes at least one of
operating the first operating portion once for the operating time that exceeds the predetermined first time,
operating the first operating portion for a number of times within a predetermined second time, and
within a predetermined third time, operating the first operating portion once for the operating time that is within the predetermined first time and operating the first operating portion once for the operating time that exceeds the predetermined first time.

11. The human-powered vehicle control device according to claim 3, wherein
the first operation procedure includes operating the first operating portion once for the operating time that is within the predetermined first time, and
the second operation procedure includes at least one of
operating the first operating portion once for the operating time that exceeds the predetermined first time,
operating the first operating portion for a number of times within a predetermined second time, and
within a predetermined third time, operating the first operating portion once for the operating time that is within the predetermined first time and operating the first operating portion once for the operating time that exceeds the predetermined first time.

12. The human-powered vehicle control device according to claim 11, wherein
the electronic controller is configured to change from the first control state to one of the plurality of third control states in accordance with one of the operations included in the second operation procedure, and
the electronic controller is configured to change from the first control state to another of the plurality of third control states in accordance with another one of the operations included in the second operation procedure.

13. The human-powered vehicle control device according to claim 11, wherein
in a case where the first operating portion is operated once for the operating time that exceeds the predetermined first time in the first control state, the electronic controller is configured to change from the first control state to the one of the plurality of third control states in which the at least one of the assist level, the maximum value of the assist force, and the amount of output of the motor per unit time is the smallest in comparison to the other of the plurality of third control states, and
when the first operating portion is continuously operated after changing from the first control state to the one of the plurality of third control states in which the at least one of the assist level, the maximum value of the assist force, and the amount of output of the motor per unit time is the smallest in comparison to the other of the plurality of third control states, the electronic controller is configured to change from the one of the plurality of third control states to another of the plurality of third control states to increase the at least one of the assist level, the maximum value of the assist force, and the amount of output of the motor per unit time in a stepped manner whenever a predetermined fourth time elapses.

14. The human-powered vehicle control device according to claim 7, wherein
the first operation procedure includes operating the first operating portion once for the operating time that is within the predetermined first time, and
the second operation procedure includes at least one of
operating the first operating portion once for the operating time that exceeds the predetermined first time,
operating the first operating portion for a number of times within a predetermined second time, and
within a predetermined third time, operating the first operating portion once for the operating time that is within the predetermined first time and operating the first operating portion once for the operating time that exceeds the predetermined first time.

15. The human-powered vehicle control device according to claim 14, wherein
the electronic controller is configured to change from the first control state to one of the plurality of third control states in accordance with one of the operations included in the second operation procedure, and
the electronic controller is configured to change from the first control state to another of the plurality of third control states in accordance with another one of the operations included in the second operation procedure.

16. The human-powered vehicle control device according to claim 14, wherein
the control states included in the third control state differ from each other in at least one of the assist level, the maximum value of the assist force, and the amount of output of the motor per unit time,
in a case where the first operating portion is operated once for the operating time that exceeds the predetermined first time in the first control state, the electronic controller is configured to change from the first control state to the one of the plurality of third control states in which the at least one of the assist level, the maximum value of the assist force, and the amount of output of the motor per unit time of the motor is the largest in comparison to the other of the plurality of third control states, and
in a case where the first operating portion is continuously operated after changing the control state to the one of the plurality of third control states in which the at least one of the assist level, the maximum value of the assist force, and the amount of output of the motor per unit time is the largest in comparison to the other of the plurality of third control states, the electronic controller is configured to change the one of the plurality of third control states to another one of the plurality of third control states to decrease the at least one of the assist level, the maximum value of the assist force, and the amount of output of the motor per unit time in a stepped manner whenever a predetermined fourth time elapses.

17. The human-powered vehicle control device according to claim 1, wherein
the operating device includes a second operating portion that differs from the first operating portion,
the electronic controller is configured to change the control state of the motor in accordance with an operation performed on the second operating portion,
wherein the plurality of control states include at least
a fourth control state in which the motor is driven in correspondence with the human driving force,
a fifth control state in which the motor is driven in correspondence with the human driving force, the fourth control state differing from the fifth control state, and
a sixth control state that differs from the fourth control state and the fifth control state,
the electronic controller is configured to change from the fourth control state to the fifth control state in a case where the second operating portion is operated in accordance with a third operation procedure in the fourth control state, and
the electronic controller is configured to change from the fourth control state to the sixth control state in a case where the second operating portion is operated in accordance with a fourth operation procedure that differs from the third operation procedure in the fourth control state.

18. The human-powered vehicle control device according to claim 17, wherein
the electronic controller is configured to change at least one of an assist level of the motor, a maximum value of an assist force of the motor, and amount of output of the motor per unit time in accordance with the control state,
the electronic controller is configured to control the motor so that the assist level in the sixth control state is less than the assist level in the fifth control state in a case where the electronic controller changes the assist level in accordance with the control state,
the electronic controller is configured to control the motor so that the maximum value of the assist force in the sixth control state is less than the maximum value of the assist force in the fifth control state in a case where the electronic controller changes the maximum value of the assist force in accordance with the control state, and
the electronic controller is configured to control the motor so that the amount of output of the motor per unit time in the sixth control state is less than the amount of output of the motor per unit time in the fifth control state in a case where the electronic controller changes the amount of output of the motor per unit time in accordance with the control state.

19. The human-powered vehicle control device according to claim 18, wherein
the sixth control state includes a plurality of sixth control states that differ from each other in at least one of the assist level, the maximum value of the assist force, and the amount of output of the motor per unit time, and
the electronic controller is configured to change from the fourth control state to one of the plurality of sixth control states in a case where the second operating portion is operated in accordance with the third operation procedure in the fourth control state.

20. The human-powered vehicle control device according to claim 19, wherein
the one of the plurality of sixth control states is selected in advance from the plurality of sixth control states.

21. The human-powered vehicle control device according to claim 19, wherein
the one of the plurality of sixth control states is the one of the plurality of sixth control states in which the at least one of the assist level, the maximum value of the assist force, and the amount of output of the motor per unit time is the smallest in comparison to the other of the plurality of sixth control states.

22. The human-powered vehicle control device according to claim 17, wherein
the third operation procedure includes operating the second operating portion once for an operating time that is within a predetermined fifth time, and
the fourth operation procedure includes at least one of
operating the second operating portion once for an operating time that exceeds the predetermined fifth time,
operating the second operating portion for a number of times within a predetermined sixth time, and
within a predetermined seventh time, operating the second operating portion once for an operating time that is within the predetermined fifth time and operating the second operating portion once for an operating time that exceeds the predetermined fifth time.

23. The human-powered vehicle control device according to claim 19, wherein
the third operation procedure includes operating the second operating portion once for an operating time that is within a predetermined fifth time, and
the fourth operation procedure includes at least one of
operating the second operating portion once for an operating time that exceeds the predetermined fifth time,
operating the second operating portion for a number of times within a predetermined sixth time, and
within a predetermined seventh time, operating the second operating portion once for an operating time that is within the predetermined fifth time and operating the second operating portion once for an operating time that exceeds the predetermined fifth time.

24. The human-powered vehicle control device according to claim 23, wherein
the electronic controller is configured to change from the fourth control state to one of the plurality of sixth control states in accordance with one of the operations included in the fourth operation procedure, and
the electronic controller is configured to change from the fourth control state to another of the plurality of sixth control states in accordance with another one of the operations included in the fourth operation procedure.

25. The human-powered vehicle control device according to claim 23, wherein
the plurality of sixth control states differ from each other in at least one of the assist level, the maximum value of the assist force, and the amount of output of the motor per unit time,
in a case where the second operating portion is operated once for an operating time that exceeds the predetermined fifth time in the fourth control state, the electronic controller is configured to change from the fourth control to the one of the plurality of sixth control states in which the at least one of the assist level, the maximum value of the assist force, and the amount of output of the motor per unit time is the largest in comparison to the other of the plurality of sixth control states, and
in a case where the second operating portion is continuously operated after changing the control state to the one of the plurality of sixth control states in which the at least one of the assist level, the maximum value of the assist force, and the amount of output of the motor per unit time is the largest in comparison to the other of the plurality of sixth control states, the electronic controller is configured to change from the one of the plurality of sixth control states to another of the plurality of sixth control states to decrease the at least one of the assist level, the maximum value of the assist force, and the amount of output of the motor per unit time in a stepped manner whenever a predetermined eighth time elapses.

* * * * *